United States Patent

Furuya et al.

Patent Number: 5,430,816
Date of Patent: Jul. 4, 1995

[54] MULTIPLE SPLIT-BEAM LASER PROCESSING APPARATUS GENERATING AN ARRAY OF FOCUSED BEAMS

[75] Inventors: Nobuaki Furuya, Kawasaki; Gen Oda, Ebina; Kouki Ichihashi, Kawasaki, all of Japan

[73] Assignee: Matsushita Electric Industrial Co., Ltd., Osaka, Japan

[21] Appl. No.: 141,003

[22] Filed: Oct. 26, 1993

[30] Foreign Application Priority Data

| Oct. 27, 1992 | [JP] | Japan | 4-288490 |
| Nov. 4, 1992 | [JP] | Japan | 4-294828 |
| May 19, 1993 | [JP] | Japan | 5-116909 |
| Jun. 10, 1993 | [JP] | Japan | 5-138191 |

[51] Int. Cl.$^6$ .......................... G02B 6/32; B23K 26/00
[52] U.S. Cl. .......................... 385/33; 385/31; 385/115; 385/116; 385/147; 219/121.75; 219/121.6; 219/121.61; 219/121.76; 359/619; 359/626
[58] Field of Search .......... 385/31, 33, 49, 115, 385/116, 147; 219/121.76, 121.77, 121.6, 121.61, 121.75; 372/101; 359/618, 619, 626, 620

[56] References Cited

U.S. PATENT DOCUMENTS

| 3,382,343 | 5/1968 | Muncheryan | 385/33 X |
| 4,398,790 | 8/1983 | Righini et al. | 385/33 X |
| 4,650,277 | 3/1987 | Husher | 385/33 X |
| 4,681,396 | 7/1987 | Jones | 385/33 X |
| 4,707,073 | 11/1987 | Kocher | 385/33 X |
| 5,029,964 | 7/1991 | Edwards et al. | 385/33 X |
| 5,054,877 | 10/1991 | Ortiz, Jr. et al. | 385/33 |
| 5,365,374 | 11/1994 | Nishikawa et al. | 385/33 X |

FOREIGN PATENT DOCUMENTS

| 58-43419 | 3/1983 | Japan | 385/33 X |
| 59-73192 | 4/1984 | Japan | 385/33 X |
| 61-137382 | 6/1986 | Japan | 385/147 X |
| 61-193794 | 8/1986 | Japan | 385/33 X |
| 63-154287 | 6/1988 | Japan | 385/33 X |
| 2-108487 | 4/1990 | Japan | 385/147 X |
| 2-177523 | 7/1990 | Japan | 385/147 X |

OTHER PUBLICATIONS

IBM Technical Disclosure Bulletin, vol. 28, No. 4, Sep. 1985, pp. 1738-1739.

Primary Examiner—Brian Healy
Attorney, Agent, or Firm—Lowe, Price, LeBlanc & Becker

[57] ABSTRACT

A laser processing apparatus includes a plurality of optical fibers formed into a bundle which is shaped such as to efficiently divide a laser beam into a plurality of split beams and transmit the split beams to respective converging lenses to be focused to have a high energy density when incident on respective workpieces. The optical fibers are shaped such as to each have a sufficiently large value of minimum radius of curvature to ensure that a small angle of divergence is maintained for each of the beams emitted from the fibers, thereby ensuring that the converging lenses can be small and inexpensive.

27 Claims, 20 Drawing Sheets

MULTIPLE SPLIT-BEAM LASER PROCESSING APPARATUS GENERATING AN ARRAY OF FOCUSED BEAMS

BACKGROUND OF THE INVENTION

1. Field of the Invention

The present invention relates to a laser processing apparatus for use in laser beam processing, where the term "laser beam processing" is used herein to signify manufacturing operations performed on a workpiece by the action of a laser beam. Specifically, the invention relates to an apparatus whereby a plurality of operations can be executed simultaneously by respectively focused beams which have been split from an original beam, and is especially applicable to use of an excimer laser beam.

2. Description of the Related Art

In the field of laser processing, use of an excimer laser (having an oscillation wavelength in the ultra-violet region) as a light source has the advantages of enabling more precise machining to be achieved than is possible with other types of laser processing. In particular, the cutting effect of an excimer laser beam is based an abrasion (i.e. non-thermal) action, since the effects of high photon energy are utilized rather than thermal effects such as are produced by other types of laser beam. That type of abrasive cutting action, together with the short wavelength of the laser light, allows minutely accurate processing to be performed.

Until now, other types of laser have been generally used, such as the carbon dioxide gas laser and YAG laser, however wider use of the excimer laser processing apparatus can be expected, due to the above advantages.

FIG. 1 shows an example of a prior art excimer laser processing apparatus. In FIG. 1, numeral 1 denotes an excimer laser oscillator, 8 denotes a workpiece, 19 denotes a workpiece carrier, and 15 denotes a laser beam condensing lens, which is a converging lens. The laser beam emitted by the laser oscillator is condensed by the converging lens 15 to be incident on the surface of the workpiece 8, with that surface being positioned near the focal position of the lens 15, to thereby cut a hole through the workpiece 8. When the cutting has proceeded to a sufficient extent, the workpiece carrier 19 is then moved to shift the workpiece 8, such that the condensed laser beam will then fall upon the next position at which a hole is to be cut, and the above operation is repeated.

Usually, the energy density of an excimer laser beam will not be sufficient to achieve cutting of the workpiece, so that in general it is necessary to condense the laser beam so as to increase the energy density, by using the converging lens 15.

FIG. 2 shows another example of a prior art excimer laser processing apparatus. In this case, numerals 2, 3 denote respective lenses which in combination function as non-converging optics for condensing the laser beam to a beam of smaller cross-sectional size, which is passed through an array of apertures formed in a mask plate 11, to fall on a workpiece 8. As in the example of FIG. 1 the workpiece 8 is mounted on a workpiece carrier 19, which will be assumed to be movable. The apertures in the mask plate 11 are formed beforehand at respective positions where holes are to be cut in the workpiece 8, and is fitted closely adjacent to the work surface of the workpiece 8. That is, the condensed laser beam from the lens 3 irradiates the entire front face of the mask plate 11, to thereby cut a plurality of holes in the workpiece 8 simultaneously.

However such an apparatus has the basic disadvantage that much of the laser energy will be wasted, since only the part of the laser beam which passes through the mask apertures is actually utilized. It has therefore been proposed to split the original laser beam into a plurality of beams, which are transmitted along respective optical fibers to the apertures in the mask plate. In that way, it should be possible to achieve greater efficiency of utilization of the laser beam. Such an apparatus is described for example in the IBM Technical Disclosure Bulletin, Vol. 28 No. 4, pp 1738 to 1739, September 1985. With the latter apparatus, which is illustrated in FIG. 3, a laser beam produced by a laser oscillator 1 is condensed by a converging lens 15, then enters a beam scrambler 14 to thereby equalize the energy density distribution of the condensed beam. The resultant beam is then directed into one end of a bundle of optical fibers 5, with the fibers being bundled closely together at that end. The other ends of the optical fibers are mutually separated as shown, being respectively fixedly attached within a 2-dimensional array of apertures which are formed spaced apart at equal intervals in a supporting plate 12. A mask 13 is superimposed on the plate 12, having apertures formed therein at arbitrary positions. These positions are selected from a standard array of positions respectively corresponding to the ends of the bundle of fibers 5, so that it is possible to select various different patterns of laser beams to be extracted from the mask 13, by using respectively different masks. In that way, it is proposed to simultaneously cut an array of holes in a workpiece, (specifically a polyamid substrate) or a plurality of workpieces, by using the apparatus of FIG. 3, while achieving high efficiency of utilizing the laser beam energy.

However such prior art types of apparatus have respective disadvantages. Considering the apparatus of FIG. 1, since it appears that the entire laser beam can be focused to a small spot on the workpiece surface, there is a high efficiency of utilization of the laser beam, so that it might be expected that the speed of cutting each hole in the workpiece would be high, enabling a high speed of processing to be achieved. However in actual practice, and in particular when an excimer laser beam is used, such a high efficiency of operation cannot be achieved, for the following reasons. If the cutting action of an excimer laser beam is used, with the beam focused to converge in the workpiece as shown, it is found that material flies off from the workpiece, due to the abrasive effects of the high photon energy of the beam. The resultant dispersed material will coat the lens, thereby obstructing transmission of the laser beam, so that a hole cannot be cut to more than a certain depth. In addition, such material may damage the lens.

There are thus problems in increasing the speed of cutting by a laser beam, through increasing the energy density of the laser beam, by condensing the beam. In general, the cross-sectional size of an excimer laser beam is typically 20 mm by 10 mm or more, and it is only possible to use a part of the entire beam width. For example if 1 mm diameter holes are to be cut in polyamid material, then in general, saturation of the cutting speed (for each irradiation by the laser beam) will occur when the energy density of the laser beam reaches approximately 1 J/cm. In general, the energy density of an excimer laser beam is approximately 0.1 J/cm, so that even if the beam energy density is increased by only a factor of 10 times, that saturation level will be reached. Such an increase in beam energy density is achieved by a beam condensation factor of 4 times (i.e. a reduction of 4 times in the horizontal and vertical dimensions respectively, of the beam cross-sectional area). That is to say, assuming the portion of the laser beam cross-section which is actually utilized is circular in shape, and is 0.4 mm in diameter, then the necessary increase in energy density to reach the saturation level can be achieved by condensing that beam portion to a diameter of 0.1 mm. In the case of using an excimer laser beam having a cross-sectional size of 20 mm by 10 mm in that way, less than 0.1% of the overall beam energy density would be utilized, so that the utilization efficiency would be very low.

The above problem is true not only of excimer laser types of apparatus, but also applies to various other types of laser processing apparatus when these are used to cut a workpiece material which has a high absorption factor.

Such laser processing is generally performed by generating the laser beam as repetitive pulses, and it is possible to precisely control the degree of each processing operation (e.g. the depth to which a hole is cut) by supplying an appropriate number of laser beam pulses. The cutting speed can be increased by increasing the pulse repetition rate. However with a practical excimer laser, that repetition rate is limited to approximately several hundred Hz, and it is difficult to achieve any increase in the cutting speed by increasing that rate.

The apparatus of FIG. 2 represents an attempt to achieve a higher speed of processing, by cutting a pattern of a plurality of holes in the workpiece 8 simultaneously, through the use of the mask plate 11 having a suitable pattern of apertures for admitting portions of the condensed laser beam from the lens 3. However as described above, the efficiency of utilization of the laser beam is very low. As a result, problems would arise in practical application of such an apparatus to manufacturing processing, i.e. problems of high operating cost and low speed of cutting the holes in the workpiece (since the energy density of the laser light emitted through each mask aperture will be low).

It might be thought that it would be possible to achieve a higher speed of laser beam processing by applying the prior art apparatus of FIG. 3. However basic problems would arise, particularly when an excimer laser beam is used. Part of the problem is the aforementioned dispersion of material that is driven out of the workpiece, by the photon energy of the laser beam. With the apparatus of FIG. 3, the laser beam is first condensed by the converging lens 15, then directed into the beam scrambler 14, to pass out through respective ones of the set of optical fibers 5. However in that case a basic advantage of the original laser beam, i.e. a very small angle of divergence of the beam, is lost. Specifically, each of the resultant laser beams emitted from the optical fibers 5 (these being referred to in the following as the split laser beams) diverges with an angle of divergence that corresponds to the numerical aperture of the optical fiber (assuming that the angle of divergence of the incident beam on the fibers is zero). Usually, these optical fibers 5 would be formed of quartz fibers, in which case the numerical aperture of each fiber is typically approximately 0.2. Such an optical fiber is used for transferring ultra-violet radiation, and efficient transfer can be achieved even if the angle of divergence of the incident laser beam applied to the optical fiber is large. However in principle, the angle of divergence of the beam emitted from such an optical fiber cannot be made smaller than the angle of divergence of the incident beam that is applied to the input end of the fiber. If each optical fiber is perfectly straight, then the incident and emitted beam of each fiber will have the same angle of divergence. If an optical fiber is curved, then the angle of divergence of the emitted beam from the fiber will be larger than that of the incident beam.

For the same reasons, the beam emitted from the beam scrambler 14 in the apparatus of FIG. 3 cannot be made to have a small angle of divergence. Specifically, the beam scrambler 14 typically consists of a single quartz fiber, which is curved as required by the respective positions of the workpiece and the laser beam source. The angle of divergence of the emitted light from a quartz fiber is expressed by the following equation (1), which has been established by the assignees of the present invention as a result of measurements obtained from experiments:

$$\Theta_o = (8 \cdot D \cdot n^2 / r + \Theta_i^2)^{\frac{1}{2}} \tag{1}$$

In the above, n denotes the refractive index of the quartz fiber, r denotes the minimum radius of curvature of the quartz fiber, $\Theta_i$ denotes the angle of incidence on the quartz fiber (full angle), D denotes the diameter of the quartz fiber, and $\Theta_o$ denotes the angle of emergence (full angle).

In general, an optical element such as the beam scrambler 14, formed of a single cylindrical quartz fiber, which as described above will be curved to some extent. In the case of a quartz fiber, the value of refractive index n will be 1.468. Also in general, the minimum radius of curvature of the beam scrambler 14 will be less than 500 mm, so that value of r will be assumed in the following. If the laser beam is assumed to have a cross-sectional size of 20 mm by 10 mm, then the diameter of the lens 15 should be 22.5 mm. Assuming the focal length of the lens 15 to be 225 mm, the angle of incidence $\Theta_i$ (full angle) of the emitted beam from the lens will be 0.1 radians. The bundle of optical fibers 5 will be assumed to consist of 100 quartz fibers, each having a cladding layer surrounding a core, with light being transmitted only through the core. The outer diameter of each fiber is 0.33 mm and the core diameter is 0.3 mm. If these are closely bundled together at the incidence ends of the fibers, to form a tubular shape, then the diameter of that tubular bundle will be 3.3 mm. Hence, the diameter D of the beam scrambler 14 should be 3.3 mm.

Inserting the above values for the beam scrambler 14 into equation (1) above, it is found that the angle of divergence (full angle) $\theta_o$, i.e. the maximum of the angles of divergence of the emitted beam from the beam scrambler 14, will be 0.35 radians. Thus even if each of the optical fibers 5 were to be ideally formed with zero curvature, in order to minimize as far as possible the angle of divergence of the respective beams emitted from the fibers 5, the angle of divergence of these beams will be at least 0.35 radians. It will be apparent that the above would also be true if the beam scrambler 14 were to be made perfectly straight, but some or all of the quartz fibers 5 had a substantial degree of curvature (as would generally be necessary, in a practical apparatus).

It might be thought that it would be possible to reduce the angle of divergence at emission from the optical fibers by reducing the angle of divergence of the laser beam when emitted from the lens 15, so as to reduce the angle of incidence of the beam on the beam scrambler 14. However, if the diameter of the lens 15 is assumed to be fixed, a reduction in the angle of divergence of emission from that lens can only be achieved by increasing the focal length of the lens. The incidence end of the beam scrambler 14 would be set at the focal position of the lens 15, so as to minimize the size of the focused image of the laser beam source which falls on that end of the beam scrambler 14. However in fact the size of that focused image will be increased as a result of the original degree of divergence of the laser beam (when emitted from the laser oscillator), and that effect will be worsened as the focal length of lens 15 is increased. Hence, some of the laser beam will fall outside the incidence end of the beam scrambler 14, so that the efficiency of utilizing the laser beam will be reduced.

It can thus be understood that it is inherently impossible to obtain a small value of angle of divergence for the laser beams which are emitted from the optical fibers 5 of such an apparatus, i.e. in which the original laser beam is condensed by means of a converging lens before reaching the beam scrambler 14.

Moreover, if such an apparatus were to be used for laser beam processing, it would be necessary to set the respective emission ends of the optical fibers 5 in very close proximity to the surface of the workpiece, in order to ensure that a sufficiently high degree of energy density is maintained for the processing (e.g. for cutting of holes in the workpiece). However in that case it becomes impossible to prevent the emission ends of the optical fibers 5 from becoming coated by material which flies out from the workpiece as a result of the laser beam energy, so that emission of each laser beam from the fibers 5 rapidly becomes obstructed soon after emission has commenced, i.e. the optical transmission efficiency rapidly becomes very low, so that completion of cutting each hole by the laser beam cannot be achieved.

Furthermore if an excimer laser beam is utilized for such hole-cutting operations, then it is necessary for the energy density of a laser beam, when incident on the workpiece, to be higher than a certain value. However that value of energy density exceeds the light energy density withstanding capabilities of the types of optical fiber that are suitable for transferring an excimer laser beam. Hence it is inherently impractical to use the apparatus of FIG. 3, to perform cutting of holes in polyamid workpieces when using an excimer laser as the light source.

It might be considered that the above problem could be overcome, if the number of optical fibers is not prohibitively large, by providing respective converging lenses in correspondence with each of the apertures in the mask 13, for focussing the respective laser beams that are emitted through the mask. In that way, the emission ends of the optical fibers 5 could be disposed at a sufficient distance from the workpiece surface to prevent contamination by the dispersed material that is driven out of the workpiece by the laser cutting action. In addition, use of such lenses would enable the energy density of each of the laser beams extracted from the mask 13 to be increased to the requisite level by condensing the beam cross-sectional size, while the energy density of the laser beams transferred via the optical fibers 5 could be set to a sufficiently low value that is within the limitations of the optical fiber characteristics.

To propose a specific example, for the case of cutting holes in a workpiece formed of polyamid (which is suited to such laser beam processing), the required energy density at the workpiece is approximately 500 mJ/Pcm. If the optical fibers 5 are assumed to be quartz fibers, with the light source being an XeCl laser beam, then in order to ensure that the transmittance of the optical fibers will not deteriorate under long-term use, it is necessary to limit the laser beam energy density within the optical fibers 5 to approximately 200 mJ/Pcm. Thus, taking into consideration transmission losses within the optical fibers, etc., it is necessary to increase the energy density of each beam emitted from the optical fibers 5 by approximately 4 times, i.e. to condense the cross-sectional size of each emitted beam by the factor ½ in the horizontal and vertical directions. If it is assumed that each of these lenses is to be spaced apart from the workpiece surface by 300 mm (as a sufficient distance to prevent the lens from becoming obstructed by material driven out from the workpiece by the laser beam action), and assuming that the distance between each optical fiber emission end and the corresponding lens is to be made twice that value, i.e. 600 mm, so that the distance between the workpiece surface and each emission end of the optical fibers is 900 mm, and further assuming (based on the assumptions and calculation made hereinabove for the apparatus of FIG. 3) that the angle of divergence of each laser beam emitted from the optical fibers 5 is 0.35 radians, then in order to achieve a sufficient degree of light-gathering by such a lens it is necessary for the lens to have an effective diameter of approximately 200 mm (i.e. 600 mm×0.35). Moreover, since each of these lenses should have a focal length of 300 mm, the numerical aperture of the lens must be 0.33 (i.e. 105/(105+300). Such optically efficient lenses would be costly to manufacture, which is a serious problem. Furthermore since it is necessary of the effective diameter of each lens to be 200 mm, the apparatus would become large in size.

FIG. 4 shows an example of an apparatus in which a plurality of laser beams are transmitted to a workpiece surface, basically as described above using respective converging lenses for the optical fibers, and which is disclosed in Japanese Patent Application Laid-open Publication No. SHO 61-193794. In FIG. 4, a laser beam produced from a laser oscillator 31 is condensed by a converging lens 32 to enter a beam scrambler 33. The resultant laser beam from the scrambler 33, having uniform energy density, is supplied to the ends of a bundle of optical fibers 34, to be thereby split into a plurality of beams which are transmitted along respective fibers 35 of that bundle 34. Each of the fibers is coupled to a corresponding converging lens 38, with converging lens 38 being fixedly mounted in a control table 38. The control table 38 is movable horizontally and vertically (for focusing the split laser beams emitted from the lenses 38) under the control of a numerical controller 40, with respect to a workpiece 39 which is supported on a table 41. Each laser beam transmitted through the fibers 35 is condensed to a small-diameter region when incident on the workpiece 39, by the action of the corresponding one of the lenses 38. A plurality of processing operations can thereby be performed simultaneously by the action of the plurality of laser beams acting on the workpiece 39.

However as can be understood from the discussion hereinabove, there are various practical problems in implementing an apparatus such as that of FIG. 4, since each of the split laser beams emitted from the fibers 35 would have a large angle of divergence, it would be necessary for the lenses 38 to be optically efficient (and therefore expensive), and for these lenses to be large in size.

Moreover, assuming that each of these lenses serves to condense the corresponding laser beam by a factor ½, then assuming for the reasons described hereinabove that the angle of divergence of each laser beam emitted from a fiber 35 is at least 0.35 radians, the angle of divergence at the workpiece surface will be twice that, i.e. 0.7 radians. Hence, the beam that is obtained from each of these lenses 38 will have a conical shape with a large angle of convergence, so that the range of workpiece thickness values in which the laser beam is highly concentrated will be small. Alternatively stated, if the workpiece is relatively thick, then the front diameter of a hole cut by such a laser beam will be substantially different from the diameter of the rear of the hole.

Another problem which must be overcome by an apparatus of the form shown in FIG. 4 is that of enabling the focus of each of the plurality of converging lenses 37 to be adjusted such that an identical, predetermined degree of condensing of the beams is achieved for each of the lenses 37, i.e. adjusted such that each of the laser beams correctly focused on the workpiece surface. In the example of FIG. 4, adjustment of focusing the beams transmitted from the fibers 35 onto the workpiece 39 is performed by vertically moving the control table 37, so that all of the heads and lenses 36, 38 are moved together. If the work surface of the workpiece 39 were absolutely flat, if the angles of divergence of the respective beams emitted from the optical fibers 35 were respectively identical, and the optical properties of the converging lenses 38 were mutually identical, with no manufacturing deviations, then such a method of focus adjustment would be possible. However in an actual manufacturing apparatus, such ideal relationships are not practical, so that if all of the emitted beams from the lenses 38 are adjusted vertically in common, uniform processing results (e.g. cutting an array of holes of respectively identical shape) will not be obtained by the actions of the respective beams.

For that reason, it would be preferable to provide means for individually adjusting the focus of each of the lenses which transmit the various laser beams to the workpiece, rather than to adjust all of these lenses in common.

One prior art method which has been proposed for such individual adjustment (in the case of an apparatus utilizing only a single laser beam) is described in Japanese Patent Application Laid-open Publication No. SHO 59-73192, and is illustrated in FIG. 5. That apparatus includes, in addition to a mechanism for such adjustment, a system for monitoring the respective intensities of light being transmitted towards, and reflected back from, the workpiece. In FIG. 5 a laser beam 52 emitted by a laser oscillator 51 is transferred through a beam-splitter 53, to be then reflected by a mirror 55 and pass through a converging lens 56. The lens 56 is fixedly retained in a movable lens mount 61, which can be adjusted in the vertical direction by rotating an adjusting screw 59. The focus of the lens 56 can thereby be adjusted so that the laser beam is condensed to a required degree, when incident on a workpiece 57 which is disposed on a table 60 below the lens mount 61. Part of the laser light reflected from the workpiece 57 is reflected back via the mirror 55 and beam splitter 53 to be measured by the power meter 58, while the level of the original laser beam 52 is measured by the power meter 54.

However in the case of a laser processing apparatus which utilizes a large number of optical fibers (for example, 100 fibers) to transmit respective laser beams to corresponding converging lenses, it would be necessary to provide a more simple arrangement for individually adjusting these converging lenses, in order to minimize the manufacturing cost of the apparatus.

Another problem of the prior art will be described referring to FIG. 6, which shows example of another type of laser processing apparatus. In FIG. 6, a laser beam emitted from a source 71 is transmitted through a converging lens 72, to fall on a set of incidence ends 74a of a large number of optical fibers 74, which are bundled together in close mutually contact at their incidence ends. The optical fibers are then curved outward as shown, with the other ends (i.e. the emission ends 74b) of the fibers being attached at approximately equidistant spacings around the periphery of a jig 75. The jig 75 is held positioned closely adjacent to a surface of a workpiece 76. Processing operations are thereby performed by respective laser beams emitted from the emission ends 74b of the optical fibers, with the outline of the result (e.g. set of welds or holes) thus produced being indicated as 76a.

With such an apparatus, in which a large number of small-diameter optical fibers are closely mutually bundled together at the incidence ends 74a, it is very difficult to prevent the optical fibers from mutually crossing over one another in the region close to the incidence ends 74a, i.e. a region in which the optical fibers are very closely bundled together. As a result of such intertwining of the fibers, the effective minimum radius of curvature of the fibers may be substantially reduced. As described hereinabove, the angle of divergence of the respective laser beams emitted from the optical fibers is strongly dependent on the minimum radius of curvature of each fiber. Thus, as a result of such cross-overs between the optical fibers at the incidence ends 74a, the energy density of the laser beams emitted from the optical fibers may not be sufficiently high optical fibers is disposed very close to the workpiece to perform the desired processing operation. That problem can similarly occur with the prior art apparatus of FIG. 4, within the optical fiber bundle 34. In that case, the angle of divergence of the laser beams emitted from some of the heads 36 may be excessively large, so that the energy density of the focused beams from the corresponding converging lenses 38 may not be sufficient. Reliable and uniform processing of the workpiece cannot be achieved in such a case.

As described hereinabove, a basic problem of laser beam cutting (particularly when using on the high photon energy of short-wavelength laser beam such as an excimer laser beam) is the effects produced by material driven out of the workpiece by the action of the laser beam. If the laser beam is condensed by a converging lens, before falling on the workpiece, so that the converging lens is positioned close to the workpiece surface, then the lens will rapidly become coated by the material driven out from the workpiece, or may be damaged by that material. One method which has been proposed in the prior art to overcome that problem is to mount each converging lens within a receptacle (generally of basically tubular shape, and referred to in the following as a processing head) provided with a nozzle. Each laser beam, after passing through the corresponding converging lens, emerges from the tip aperture of the nozzle to fall on the workpiece surface. A current of a gas is made to flow into each processing head, to be ejected from the nozzle aperture, and flow over the region of the workpiece that is being cut by the corresponding laser beam. Material driven out of the workpiece is thereby prevented from reaching the lenses.

Such a gas will be referred to in the following as "assist gas", and can have other functions besides protection of the lenses from obstruction or damage due to material driven out of the workpiece by the effects of laser beam cutting. Specifically, with some types of workpiece material it is essential that the laser beam processing operation (e.g. welding or cutting) take place in the presence of a specific gaseous atmosphere, typically formed of an inert gas such as helium. By passing a flow of such an assist gas through a nozzle as described above, such a condition can be established for a small region immediately surrounding each position of incidence of a laser beam on the workpiece.

However some types of assist gas, such as helium, are expensive. It is therefore necessary to minimize the consumption of the gas as far as possible, to achieve practicable processing costs. That can be done by making the size of each nozzle aperture as small as possible (to minimize the total rate of flow of the assist gas). However in that case it becomes necessary to accurately locate the axis of each laser beam in the center of the respective nozzle aperture. This is difficult to achieve in practice, due to manufacturing variations in the laser beam axis positions and in the positions of the nozzle apertures, and also because the laser beam axis may be periodically varying slightly in position. It has therefore been difficult to effectively achieve a desired reduction in the consumption of the assist gas.

One method which has been proposed in the prior art for overcoming that problem, in Japanese Patent Application Laid-open Publication No. HEI 2-108487, is illustrated in FIG. 7. In FIG. 7, gas from a pressurized cylinder 97 flows into an upper chamber containing a converging lens 98, which focuses a laser beam 95. A movable nozzle 91 is mounted at the lower end of the upper chamber, being laterally movable, for example under the control of a controller 92 which functions in accordance with a detected amount and rate of lateral movement of the laser beam 95 with respect to a workpiece 94 to move the nozzle 91 in the same direction and by the same amount of movement. It can be understood that such control of the laterally movable nozzle 91 enables the central axis of the laser beam 95 to be adjusted to be held continuously at the center of the tip aperture of the nozzle 91. The amount of allowable (uncorrected) mutual position deviation between the nozzle tip and the laser beam can thereby be doubled, by comparison with an apparatus in which the nozzle is fixed in position. Thus, the nozzle tip aperture can be made smaller, and the requisite rate of flow of the assist gas can thereby be reduced.

However it will be apparent that in the case of a laser processing apparatus producing a large number of laser beams which are transmitted through respective optical fibers and respective converging lenses, it would be impractical to provide such a complex nozzle-adjustment system for each of the laser beams, since the overall manufacturing cost of the apparatus would be greatly increased. There is therefore a requirement for achieving a similar result, but with a less complex arrangement, which would be applicable to a laser processing apparatus producing a large number of laser beams.

In a practical apparatus, when an original laser beam is split among a plurality of thin optical fibers to be transmitted through the fibers as in the example of FIG. 4, the respective laser beams which are emitted from the optical fibers will not have identical angles of divergence. Convergence lenses which are used to focus these laser beams on a workpiece are generally fixed within respective cylindrical mounts, i.e. processing heads, as mentioned hereinabove. Theoretically, the relationship between the lens diameter and the angle of divergence should be such that the diameter of each emitted beam, when reaching the corresponding converging lens, is the same as the lens diameter. However in practice it is found that variations in the angle of divergence occur between the various optical fibers which are coupled to the processing heads. Such variations are to be expected, since as described above referring to equation (1), the emission angle of divergence of a laser beam which is transmitted along an optical fiber will depend upon factors such as the diameter of the optical fiber and the minimum radius of curvature of the fiber, and these will be subject to manufacturing variations. Such variations in the angle of divergence result in variations in the convergence angles of the respective laser beams, when these emerge from the corresponding converging lenses to fall on the workpieces. Due to these variations in convergence angle between the laser beams of respective processing heads, it is difficult to achieve uniformity of processing by such an apparatus. For example, holes which are cut by beams from different processing heads may be respectively different in shape, as seen in cross-section.

Thus, such variations in the angle of divergence between respective optical fibers present an obstacle to achieving highly uniform processing of different workpieces simultaneously by such a multi-beam laser processing apparatus.

In an attempt to overcome the problem whereby the respective converging lenses for the multiple laser beams of such an apparatus tend to become damaged or obstructed by material which is driven out of the workpiece due to the effects of the laser beam (especially in the case of the excimer laser, due to the high photon energy of the beam), a proposal has been made in Japanese Patent Application Laid-open Publication No. SHO 61-137382 whereby these converging lenses are made replaceable. With that proposal, the lenses are mounted such as to facilitate such replacement. However these lenses contribute substantially to the overall cost of such a laser processing apparatus, and repeated replacement of the lenses would result in a significant increase in the operating expenses.

A proposal has also been made (in Japanese Patent Application Laid-open Publication No. SHO 63-154287) to utilize a flow of assist gas in such a way as to prevent such obstruction or damage to the converging lenses will occur. However such a method can only slow down the rate at which the lenses become coated or damaged by the material driven out of the workpieces, and over a long period of use of the apparatus the problem will gradually increase.

There is therefore a requirement for a laser processing apparatus which can overcome the various problems of the prior art set out above, so that rapid processing with low operating costs can be achieved.

SUMMARY OF THE INVENTION

It is an objective of the present invention to overcome the various problems of the prior art set out above, by providing a laser processing apparatus whereby a high speed of processing can be achieved, whereby components such as converging lenses can be small in size and inexpensive to manufacture, whereby high stability of operation is ensured, without a danger of deterioration or non-uniformity of processing occurring due to such reasons as obstruction or damage to lenses, or due to variations between respective angles of incidence of plural laser beams which are to be condensed by respective lenses.

To achieve the above objectives, according to a first aspect, the invention provides a laser processing apparatus comprising:
- a laser oscillator;
- a laser beam splitting and transmitting unit formed of a plurality of optical fibers arranged in a bundle, for splitting a laser beam emitted by the laser oscillator into a plurality of split laser beams and transmitting the split laser beams along respective ones of the optical fibers to respective emission ends the optical fibers, the optical fibers having respective incidence ends disposed mutually closely together, positioned to receive the laser beam, and having respective emission ends of the optical fibers spaced apart at regular intervals;
- a split laser beam condensing optical system including a plurality of converging lenses each positioned in relation to a corresponding one of the emission ends, for focusing the split laser beams to produce respective condensed split laser beams; and
- workpiece support means for supporting a plurality of workpieces in relation to the split laser beam condensing optical system at respective positions for processing all of the workpieces simultaneously by respective ones of the condensed split laser beams.

Such a laser processing apparatus may further include an optical system for condensing the laser beam emitted by the laser oscillator, to form a condensed laser beam having a value of angle of divergence which is substantially unchanged from an angle of divergence of the original laser beam. This, in conjunction with ensuring that each fiber in the bundle of optical fibers has a sufficiently large radius of curvature, ensures that (since the angle of divergence of the original laser beam is extremely small) each of the split laser beams which are supplied to the respective converging lenses will have a sufficiently small angle of divergence. Hence, these lenses can be small in size and require only a small value of numerical aperture, and so are inexpensive.

Such a laser processing apparatus is suitable for use with a pulse-operation laser oscillator emitting a laser beam having a wavelength that is at least 190 nanometers, and in particular is suited to use with an excimer laser oscillator.

With such a laser processing apparatus, the plurality of workpieces are preferably supported on a workpiece carrier which is operated under computer control such as to be step-shifted to a predetermined new position prior to executing each processing operation. An identical processing pattern can thereby be executed on each of the workpieces simultaneously. With such a laser processing apparatus, the bundle of optical fibers is preferably configured in accordance with the conditions that:

(a) The distance between a plane containing the incidence ends of the optical fibers and a plane containing the array of emission ends of the optical fibers is at least 1.5 times a distance between a central point of the array of emission ends and a peripherally outermost one of the emission ends;

(b) each of the optical fibers is formed with a predetermined shape of curvature in a first portion extending from the incidence end of the optical fibers to a central point which is coincident with a plane situated midway between and parallel to the plane containing the incidence ends and the plane containing the emission ends, and is formed with the predetermined shape of curvature, but of opposite direction, in a second portion extending from the central point to the emission end thereof;

(c) all of the optical fibers are oriented mutually parallel in direction, at the incidence ends and at the emission ends of the optical fibers; and (d) for each of the optical fibers, at the central point thereof, a tangent at the point with respect to curvature of the first portion and a tangent at the point with respect to curvature of the first portion and a tangent at the point with respect to curvature of the second portion are mutually coincident.

Furthermore, each of these optical fibers should have a value of minimum radius of curvature that is at least 300 times the core diameter of the fiber.

Such a laser processing apparatus may also include a beam scrambler formed of a transparent body having an elongated straight shape, disposed between an optical system which condenses the original laser beam, and the laser beam splitting and transmitting unit. In that case, the angle of divergence of the condensed laser beam, transmitted from the original laser beam condensing optical system to be incident on the beam scrambler, should be no greater than 0.1 radian. Each of the fibers of the bundle of optical fibers should have a minimum radius of curvature which is at least 300 times the core diameter of the fiber.

Furthermore with such a laser processing apparatus, each of the optical fibers is preferably formed with a straight portion extending from at least an emission end or an incidence end of the fiber, the straight portion having a length which is at least 50 times the core diameter of each optical fiber.

According to another aspect, the invention provides a laser processing apparatus including a laser oscillator, a plurality of optical fibers arranged for splitting a laser beam emitted by the laser oscillator into a plurality of split laser beams and transmitting the split laser beams along respective ones of the optical fibers to respective emission ends of the optical fibers, a plurality of processing heads respectively connected to the emission ends and having mounted therein respective converging lenses each optically coupled to a corresponding one of the emission ends, and workpiece support means for supporting a plurality of workpieces adjacent to the processing heads, for processing the workpieces by respective condensed split laser beams emitted from the processing heads;
wherein the processing heads comprise respective adjustment mechanisms for movably supporting the optical fibers at the emission ends thereof and for enabling individual position adjustment of each of the emission ends in relation to a corresponding one of the converging lenses.

Irrespective of the arrangement utilized to focus each of the split laser beams through respective converging lenses on respective workpieces, with an apparatus according to the present invention, it has been found preferable that the work surface of each workpiece is positioned slightly farther from a corresponding one of the converging lenses than is a focal position of that converging lens.

According to another aspect, the invention provides a laser processing apparatus including a laser oscillator, a plurality of optical fibers arranged for splitting a laser beam emitted by the laser oscillator into a plurality of split laser beams and transmitting the split laser beams along respective ones of the optical fibers to respective emission ends of the optical fibers, a plurality of processing heads respectively connected to the emission ends, the processing heads having mounted therein respective converging lenses each optically coupled to a corresponding one of the emission ends and each of the processing heads being formed with a nozzle portion having a nozzle aperture formed in a tip of the nozzle portion, with a condensed split laser beam produced from a corresponding one of the converging lenses being transmitted through the nozzle aperture, a workpiece table for supporting a plurality of workpieces respectively adjacent to the processing heads, and means for passing a flow of a gas through each of the processing heads to be ejected through the nozzle aperture thereof;

wherein each of the nozzle portions of the processing heads has formed externally thereon a peripherally surrounding nozzle cover, the nozzle cover having a peripheral annular surface which is substantially coplanar with the tip of the nozzle portion.

By providing such a nozzle cover, the gas (e.g. an inert gas such as helium, which is relatively expensive) which is ejected from a nozzle aperture does not immediately mix with the atmospheric air, so that a high density of the gas can be maintained at the position of incidence of each laser beam on a workpiece, even if the nozzle apertures are relatively large and the rate of flow of the gas is relatively low.

It is a further aspect of the invention that, when each of the aforementioned converging lenses for respective split laser beams is mounted within a corresponding processing head, each processing processing head preferably is provided with a protective plate which is optically transparent and is positioned between a corresponding one of the converging lenses and a corresponding one of the workpieces, with each of the protective plates being removeably mounted in the corresponding one of the processing heads. The converging lenses are thereby effectively protected against damage or obstruction resulting from material which is driven out of the workpieces by the action of the laser beams, during processing. Each of the protective plates is preferably formed of an identical material to the converging lenses.

According to another aspect, the invention provides a laser processing apparatus including a laser oscillator, a plurality of optical fibers arranged for splitting a laser beam emitted by the laser oscillator into a plurality of split laser beams and transmitting the split laser beams along respective ones of the optical fibers to respective emission ends of the optical fibers, a plurality of processing heads respectively connected to the emission ends and having mounted therein respective converging lenses each optically coupled to a corresponding one of the emission ends, and workpiece support means for supporting a plurality of workpieces adjacent to the processing heads, with respective surfaces of the workpieces oriented substantially in a common plane;

wherein each of the processing heads fixedly retains an emission end of a corresponding one of the optical fibers in a stationary condition, and wherein each of the processing heads includes a movable portion having mounted therein a corresponding one of the converging lenses, and includes an adjustment mechanism operating on the moveable portion for position adjustment of the one of the converging lenses along a direction which is perpendicular to the common plane.

Such an adjustment mechanism is preferably configured to be rotatable for executing the position adjustment.

It is a further aspect of the invention that each of the aforementioned converging lenses is preferably mounted within a corresponding processing head at a position with respect to a corresponding one of the emission ends of the optical fibers whereby a split laser beam emitted from the corresponding emission end has a diameter of divergence, at the position of the converging lens, which is substantially larger than an effective diameter of the converging lens.

In that case, the apparatus is preferably configured such that within each of the processing heads, a predetermined part of peripheral rays of a split laser beam emitted from a corresponding one of the emission ends are effectively shielded from reaching a corresponding one of the converging lenses. As a result, the effects of variations between respective angles of incidence of the various split laser beams are substantially eliminated. Significantly greater uniformity of processing can thereby be achieved.

The invention moreover provides a laser processing apparatus comprising:
 a laser oscillator;
 a first plurality of optical fibers, for splitting a laser beam emitted by the laser oscillator into a plurality of split laser beams and transmitting the split laser beams along respective ones of the optical fibers to respective emission ends the optical fibers, the optical fibers having respective incidence ends thereof positioned with the laser beam incident thereon, and having respective emission ends of the optical fibers spaced apart at regular intervals;
 a second plurality of optical fibers having respective incidence ends thereof optically coupled to respective ones of the emission ends of the first plurality of optical fibers, for transmitting the split laser beams; and
 receptacle means for enclosing and fixedly retaining the first plurality of optical fibers in a condition preventing mutual cross-overs among the first plurality of optical fibers, with the incidence ends of the first plurality of optical fibers respectively exposed at an incidence end of the receptacle means and the emission ends of the first plurality of optical fibers respectively exposed at an emission end of the receptacle means.

Such a laser processing apparatus preferably comprising a plurality of converging lenses disposed at respective emission ends of the second plurality of optical fibers, for condensing respective ones of the split laser beams.

The receptacle means may consist of a holder which is of hollow tubular form, and a filler material occupying space within the holder surrounding the first plurality of optical fibers.

The emission ends of the first plurality of optical fibers are preferably arranged in a plane of the emission end of the receptacle means at positions which are different from and proportionally equivalent to respective positions of corresponding ones of the incidence ends of the first plurality of optical fibers in a plane of the incidence end of the receptacle means.

By fixedly retaining the bundle of optical fibers within a holder in that way, with each fiber being shaped and positioned appropriately such as to ensure that the minimum radius of curvature is sufficiently large and such that cross-overs between adjacent fibers do not occur (thereby accidentally reducing the minimum radius of curvature), a high degree of stability can be achieved for operation of the laser processing apparatus.

Furthermore by leaving short portions of an outer sheath upon a portion of each of the fibers within the holder, extending from the emission ends of the fibers, the fibers can be arranged with these outer sheath portions in mutual contact, such that the relative positions of the emission ends of the fibers are fixedly defined (after the filler material has been inserted) in a very simple manner.

DESCRIPTION OF PREFERRED EMBODIMENTS

Figure 8:
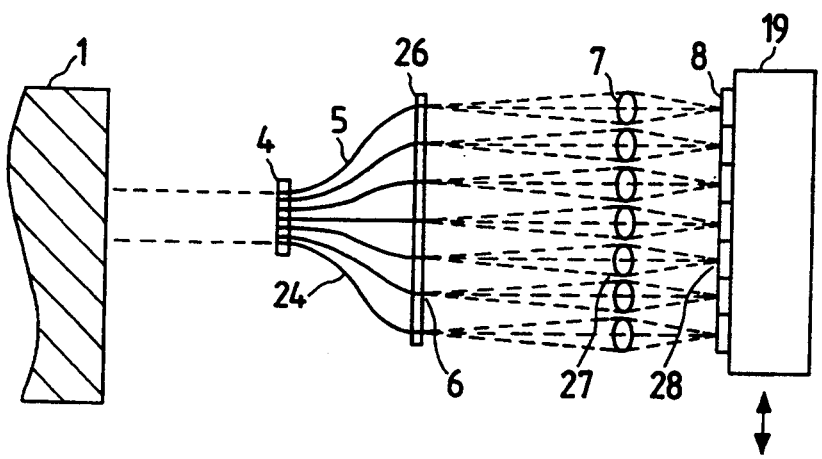
FIG. 8 illustrates a first embodiment of a laser processing apparatus according to the present invention, having a bundle of optical fibers functioning as a beam splitting and transmission device, for transmitting respectively split laser beams through respective converging lenses to workpieces.

A first embodiment of a laser processing apparatus according to the present invention will be described referring to FIG. 8. This embodiment enables a plurality of holes to be cut simultaneously in respective workpieces. In FIG. 8, numeral 1 denotes an excimer laser oscillator which emits a laser beam 1a, 24 denotes a beam splitting and transmission unit which operates on the excimer laser beam and consists of a plurality of optical fibers 5 which are suitably shaped and arranged in a bundle. The laser beam 1a is incident on respective incident ends 4 of the fibers 5, to be thereby divided into a plurality of split laser beams which are transmitted to respective emission ends 6 of the optical fibers 5. Numeral 26 denotes a supporting body which holds the emission ends 6 of the optical fibers 5 at respective fixed positions, spaced apart at regular intervals. For simplicity of description, only part of the actual number of optical fibers 5 is shown in the drawing. 27 denotes a set of converging lenses constituting a split laser beam condensing optical system, which condense respective split laser beams emitted from the emission ends 6 of the bundle of optical fibers 5, 28 denotes of a set of workpieces which are positioned respectively corresponding to the converging lenses 27. It is assumed that each beam condensed by one of the lenses 27 falls on a corresponding one of the set of workpieces 28. 19 denotes a workpiece carrier which carries the workpieces 28. The workpiece carrier 19 is movable (by means not shown in the drawing) to shift the workpieces 28, in common, relative to the set of laser beams that are directed through the converging lenses 27, in a plane as indicated by the arrows. In the following, the term "working surface" is to be understood as signifying the surface of a workpiece which faces towards the split laser beam converging lenses.

The operation of this embodiment is as follows. The cross-sectional shape of the laser beam emitted from the laser oscillator 1 is oblong, with dimensions 10 mm (height) by 20 mm (width). A central portion of that laser beam, which has a relatively uniform energy density, is directed into the incidence ends 4 of the bundle of fibers 5. The bundle of optical fibers 5 is formed of 100 quartz fibers (each formed of a core which is covered by a cladding layer), each fiber having an outer diameter of 0.55 mm, with the incidence ends 4 of the fibers 5 being packed together such as to have an overall cross-sectional size of 4.5 mm (height) by 7.6 mm (width).

The emission ends 6 of the bundle of fibers 5 are held in a fixed 2-dimensional array by the supporting member 26, positioned respectively opposite the workpieces 28. In the case of a test apparatus which was constructed in accordance with this embodiment, the workpieces 28 were each 100 mm square in shape, arranged in a 10 by 10 rectangular array, i.e. a total of 100 workpieces.

Each of the converging lenses 27 provides a beam condensing factor of 1/3.3, so that the diameter of each beam emitted from the emission ends 6 of the bundle of fibers 5 must be approximately 3 times the required diameter of the holes to be cut in the workpieces. Although each fiber of the bundle of optical fibers 5 has a diameter of 0.55 mm, the laser beam passes through only a central core of each fiber, which has a diameter of 0.5 mm. Since each emitted split laser beam from the bundle of optical fibers 5 is condensed by the factor 1/3.3, the diameter of the beam when incident on the workpiece surface will be 0.15 mm. The condensed split laser beams thus produced fall vertically on respective ones of the workpieces 28.

It should be noted that the term "split laser beam" as used in this specification and the appended claims is to be understood as signifying one of a plurality of laser beams which are derived, by beam splitting, from an original laser beam emitted by a laser oscillator.

It will be assumed that the focal length of each of the converging lenses 27 is 140 mm, the distance between each of the converging lenses 27 and the corresponding one of the emission ends 6 of the optical fibers 5 is 600 mm, and the spacing between each of the converging lenses 27 and the opposing surface of the corresponding workpiece is 180 mm. Thus the distance between the emission ends 6 of the bundle of fibers 5 and the workpiece surfaces is 780 mm, so that sufficient spacing is provided not only between the emission ends 6 of the bundle of fibers 5 and the surfaces being cut by the laser beams, but also between the converging lenses 27 and the workpiece surfaces, i.e. sufficient distance to prevent contamination of the lenses or the ends of the optical fibers by material that is driven off from the workpieces 28 by the action of the laser beams.

In order to enable the converging lenses 27 to be compact and inexpensive, the angle of divergence of the laser beams emitted from the emission ends 6 of the bundle of fibers 5 should be held to a small value, which is preferable less than 0.1 radians. In that case, if the distance between the emission ends 6 of the bundle of fibers 5 and the corresponding ones of the converging lenses 27 is made 600 mm, then the amount of beam divergence at each lens will be within a diameter of 60 mm. Hence, the effective diameter of each of the converging lenses 27 should be 60 mm, to ensure that most of each diverging laser beam emitted from the emission ends 6 of the bundle of fibers 5 will pass through the corresponding one of the converging lenses 27. Thus the numerical aperture of each of the converging lenses 27 must be approximately 0.16 (i.e. 30/(30+180). Hence, each of the converging lenses 27 can be small in diameter and is required to have only a small value of numerical aperture, and so can be inexpensive.

It can be understood that with this apparatus, respective holes can be cut in each of the 100 workpieces 28 simultaneously. The workpieces 28 are then step-shifted in position by a computer control system (not shown in the drawings) which acts on the carrier 19, in accordance with a predetermined computer program, and another set of holes are then cut simultaneously, and so on successively. In that way, an identical pattern of holes can be rapidly cut in each of the workpieces 28 at the same time, by successive stepping of the positions of the workpieces 28.

Figure 10:
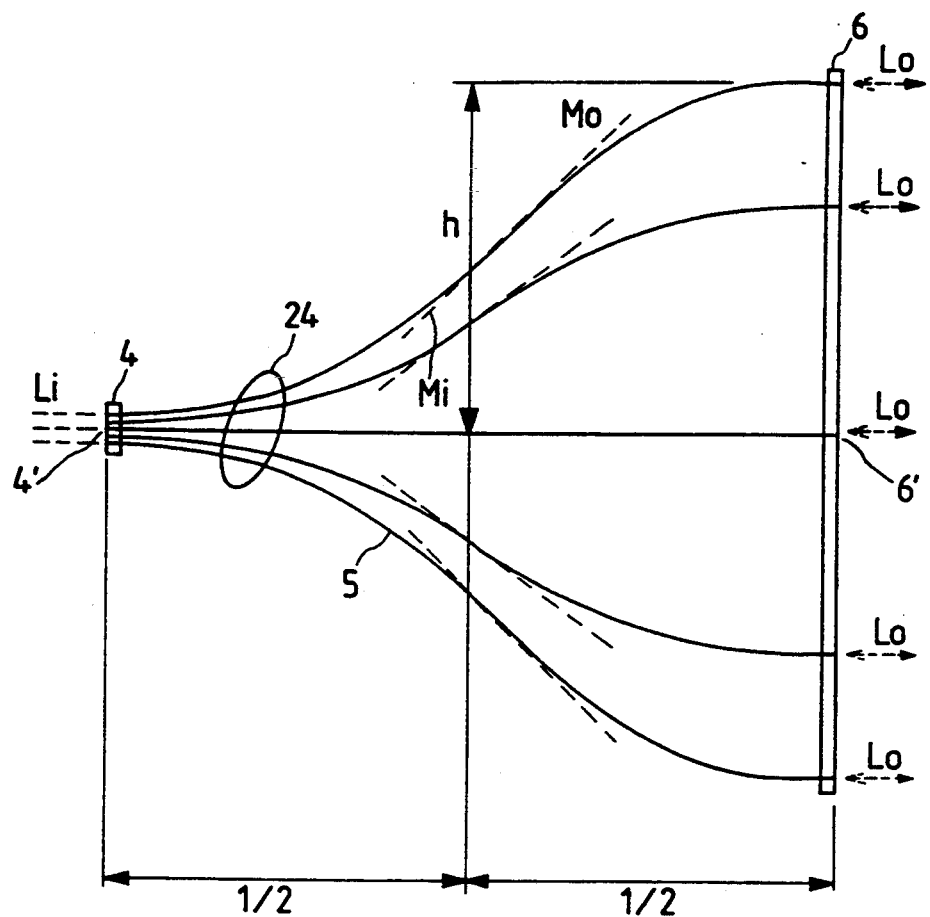
FIG. 10 is a cross-sectional view of the bundle of optical fibers of the first and second embodiments, for defining various dimensional relationships of the optical fibers.

Basic design parameters for the bundle of optical fibers 5 of the above embodiment will be described, assuming that the laser beam produced from the laser oscillator 1 has an angle of divergence of less than 0.1 radians, referring to FIG. 10. In FIG. 10, 4' denotes a point at the center of a vertical plane which contains all of the incidence ends 4 of the fibers 5 and is bounded by these incidence ends 4. Similarly, 6' denotes a point within a vertical plane which contains all of the emission ends 6 of the optical fibers 5 and is bounded by these emission ends 6, the point 6' being located centrally in that plane. FIG. 10 shows a cross-sectional view of the bundle of optical fibers 5 taken in an arbitrary plane which passes through a straight line connecting the points 4', 6'. The distance 1 between the incidence ends 4 of the bundle of fibers 5 and emission ends 6 of the bundle of fibers 5 will be assumed to be approximately 1.4 meters, and the maximum separation distance h will be assumed to be 0.7 m (where "maximum separation distance" here signifies the distance between the central point 6' and the most peripherally distant one of the emission ends 6 of the bundle of fibers 5). The value of distance 1 between the plane of the incidence ends 4 and the plane of the emission ends 6 should be made at least 1.5 times the maximum separation distance h. It is also assumed that the minimum radius of curvature of each of the bundle of optical fibers 5 is 0.87 m, and since the angle of divergence of the original laser beam will be very small, the angle of incidence of the laser beam on the incidence ends 4 of the bundle of fibers 5 can be assumed to be no greater than 0.01 radian. The direction of incidence (designated as Li) of the laser beam on the incidence ends 4 of the optical fibers 5, and the direction of emission (designated as Lo) from the emission ends 6 of the optical fibers 5 are made mutually parallel, and it is arranged that each of the optical fibers 5 is formed to have an identical shape of curvature on either side of a point of inflection which is located at a central position of the fiber (where that central position is a point of intersection between the fiber and a central plane, that central plane being positioned midway between and parallel to respective planes which contain all of the incidence ends 4 and all of the emission ends 6 of the optical fibers 5), but with the directions of curvature on either side of that point being mutually opposite. Each of the fibers 5 is further shaped such that the tangent line (designated as Mi) on the incidence side of the point of inflection and the tangent line (designated as Mo) on the other side of the point of inflection are mutually coincident. As a result, using the equation (1) above, it is found that the angle of divergence of the emitted beam from each optical fiber of the bundle 5 will be no more than 0.1 radians.

With this embodiment, the radius of curvature of each of the optical fibers 5 is made proportional to the core diameter of the fiber, and is preferably made at least 1500 times the core diameter. The embodiment utilizes quartz fibers which each have an overall diameter of 0.55 mm and core diameter of 0.5 mm, and so are relatively thick. Hence a minimum radius of curvature of approximately 0.9 meter is permissible for the bundle of optical fibers 5.

The beam energy parameter values are determined as follows. The laser beam emitted from the laser oscillator 1 has an energy density of 85 mJ/cm, which is within the light energy withstanding capabilities of the quartz fibers used as the optical fibers 5, so that no problems will arise in that respect. Each of the converging lenses 27 applies a beam condensing factor of 1/3.3. times, so that the laser beam energy density is increased by approximately 10 times. Taking into account the transmission losses which occur in the quartz fibers (approximately 15%) and the losses which occur within the converging lenses 27 (approximately 30%), the resultant energy density of each laser beam that is incident on the workpieces is at least 500 mJ/cm. Such a level of energy density will be sufficient for cutting holes in workpieces such as circuit boards formed of polyamid, for example.

In this embodiment, the laser oscillator 1 is an XeCl laser having an oscillation wavelength of 308 nm. As a result, transmission losses within the quartz fibers are relatively low, and do not present any problem in a practical apparatus. Using an actual excimer laser processing apparatus configured in accordance with this embodiment, with a pulse repetition rate of the laser beam of 300 Hz and 51 W of laser power, tests were performed to cut holes in respective workpieces consisting of polyamid boards, each 100 micron thick. It was found possible to cut each hole in a time of 1.7 seconds, i.e. a total of 100 holes were cut simultaneously in that time interval.

Figure 1:
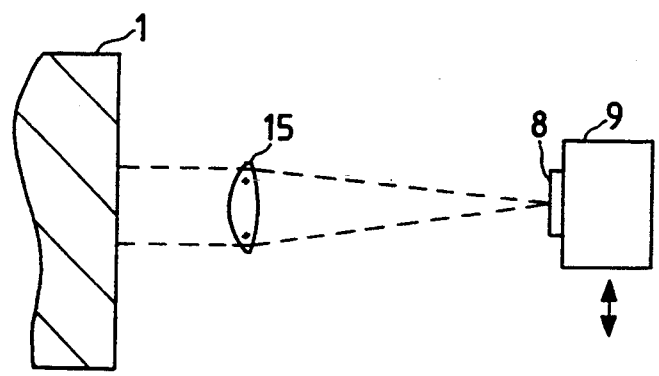
FIG. 1 illustrates an example of a prior art laser processing apparatus, in which a single laser beam is condensed by a converging lens to be incident on a workpiece.
Figure 2:
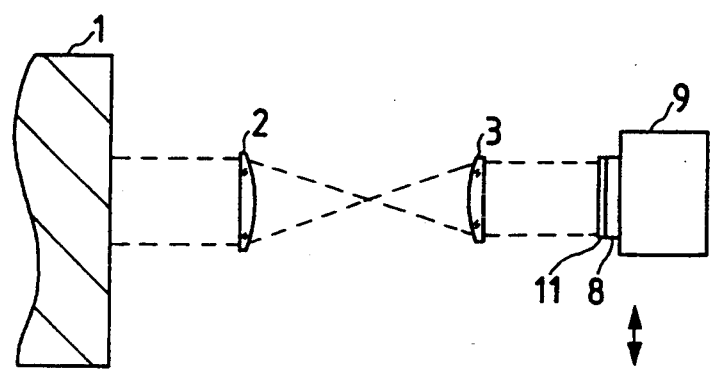
FIG. 2 illustrates a second example of a prior art laser processing apparatus, in which a laser beam is applied through apertures in a mask to a plurality of locations on a workpiece surface.

With the prior art example of FIG. 1 on the other hand, at maximum cutting speed, a time of 0.6 seconds is required to cut a single hole in a workpiece. Thus, it would require 60 seconds to cut 100 holes. The present invention therefore enables an increase in processing speed of approximately 35 times to be achieved, by comparison with such a prior art type of laser beam processing apparatus. If the prior art apparatus of FIG. 1 and the apparatus of the above embodiment are assumed to each utilize laser oscillators providing the same power output value, then because of the difference in processing speeds, the manufacturing costs with the above embodiment (i.e. for each hole-cutting operation) would be approximately 1/35 times that of the prior art apparatus. Thus, the embodiment provides significant advantages with respect to increased speed of operation and reduced operating costs.

Figure 9:
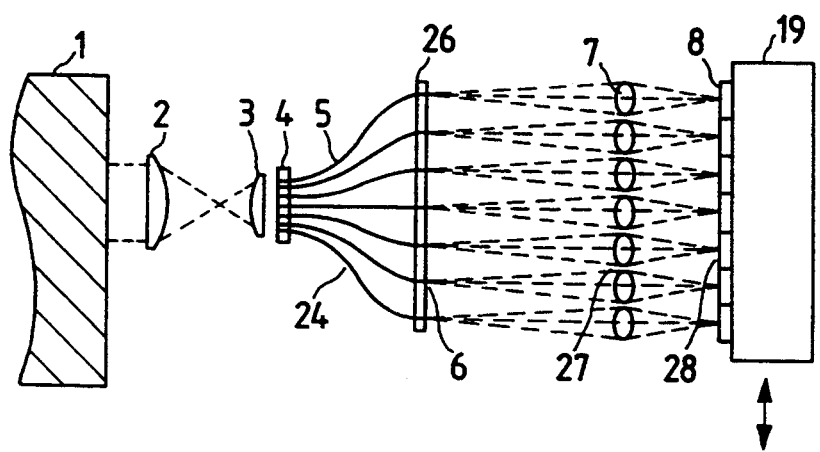
FIG. 9 illustrates a second embodiment of a laser processing apparatus according to the present invention, also having a bundle of optical fibers functioning as a beam splitting and transmission device, and optics for condensing an original laser beam to a cross-sectional size corresponding to that of the bundle of optical fibers.

FIG. 9 shows the configuration of a second embodiment of a laser processing apparatus according to the present invention. In FIG. 9, elements corresponding to elements in the embodiment of FIG. 8 are designated by identical reference numerals, and detailed description of these will be omitted. This embodiment differs from the embodiment of FIG. 9 only in being provided with an original laser beam condensing optical system consisting of a combination of a first lens 2 and second lens 3 through which the laser beam emitted from the laser oscillator 1 is transferred to the incidence ends 4 of the bundle of fibers 5, which function in combination to condense the original laser beam 1a by a predetermined degree. The original laser beam 1a emitted from the laser oscillator 1 has an oblong cross-sectional shape, with dimensions 10 mm (height) by 20 mm (width). The lens combination 2, 3 produces a condensed laser beam having cross-sectional dimensions of 3 mm (height) and 6 mm (width), so that the beam will be efficiently transferred into the optical fibers 5 through the incidence ends 4. With this embodiment the bundle of optical fibers 5 consist of 100 quartz fibers. However the bundle of optical fibers 5 is shaped in cross-section, at the incidence ends 4, to have the dimensions 2.7 mm (height) by 4.6 mm (width).

With the second embodiment of FIG. 9, the workpieces 28 are arrayed in the same way as for the first embodiment, however each of the converging lenses 27 provides a beam condensation factor of ½, so that the diameter of each laser beam emitted from the emission ends 6 of the bundle of fibers 5 must be twice the diameter that is required for the holes that are to be cut in the workpieces. Each of the optical fibers 5 has an outer diameter of 0.33 mm, while the diameter of the central core (through which light actually passes) has a diameter of 0.3 mm. Hence, the diameter of each laser beam when incident on a workpiece surface is 0.15 mm.

Each of the converging lenses 27 of this embodiment has a focal length of 200 mm, is separated from the corresponding one of the emission ends 6 of the bundle of fibers 5 by 600 mm, and is separated from the work surface of the corresponding one of the workpieces 28 by 300 mm. Thus there is a distance of 900 mm between each of the emission ends 6 of the bundle of fibers 5 and the opposing surface of the corresponding workpiece. These amounts of separation are sufficient to ensure that the emission ends 6 of the bundle of fibers 5 and the converging lenses 27 will not become contaminated by material driven out from the workpieces 28 during the hole-cutting operation.

From the aspect of optical design, it is necessary to ensure that the angle of emergence of each laser beam from the emission ends 6 of the bundle of fibers 5 is no more than 0.1 radians. Due to the use of a non-converging lens combination 2, 3 for condensing the original laser beam, as described hereinafter, the angle of divergence of each laser beam emitted from the quartz fibers 5 will be no greater than 0.1 radian. In that case, since there is a distance of 600 mm between each of the emission ends 6 of the bundle of fibers 5 and the corresponding one of the lenses 27, the laser beam will diverge to have a cross-section of 60 mm diameter within the plane of the lens. Hence, the effective diameter of each lens 27 should be made 60 mm. With these conditions, the numerical aperture of each lens 27 should be approximately 0.1 (i.e. 30/(30+300)). Such lenses can therefore be inexpensive to manufacture, and small in size.

With this embodiment as for the first embodiment, it is possible to simultaneously cut respective patterns in 100 workpieces by computer control of successive position stepping of the workpieces, each workpiece having a work surface that is 100 mm square, and the converging lenses provided for condensing the split laser beams can be small in size and inexpensive.

The configuration of this embodiment is defined in FIG. 10, in the same way as for the first embodiment. It will be assumed that the distance between the incidence ends 4 and the emission ends 6 of the bundle of optical fibers 5 is 1.1 meters, the maximum separation distance (i.e. from the axially central position to a peripherally outermost one of the fibers 5, as defined hereinabove) is 0.7 meter, and the minimum radius of curvature of the fibers 5 is 0.58 meter, that a parallel relationship is established between the direction L1 of incidence of the laser beam on the incidence ends 4 of the bundle of fibers 5 and the direction Lo of laser beam emission from the emission ends 6 of the fibers 5, and that the tangent line Mi on the incidence side of the point of inflection of each optical fiber and the tangent line Mo on the other side of the point of inflection are mutually coincident. With this embodiment, due to the fact that optics 2, 3 are utilized which condense the laser beam 1a from the laser oscillator 1 without introducing substantial convergence of the beam, and assuming that the angle of divergence of the original laser beam is no greater than 0.01 radian, the angle of divergence of the beam when incident on the ends 4 of the bundle of fibers 5 will be no greater than 0.033 radian. The diameter of each of the quartz fibers constituting the optical fibers 5 is 0.33 mm and the minimum radius of curvature is 0.6 m. Applying these conditions to the above equation (1), it is found that the angle of divergence of each laser beam emitted from the optical fibers 5 will be held to a value that is no greater than 0.1 radian. Thus with this embodiment too, that value of angle of divergence is sufficiently small.

The energy density conditions for this embodiment are as follows. The laser oscillator 1 generates a laser beam having an energy density value of 21 mJ/cm, which is increased by approximately 3 times by the beam condensing lenses 2, 3. Taking into account transmission losses which occur in the lenses 2, 3, the energy density of the laser beam when incident on the incidence ends 4 of the bundle of fibers 5 is 200 mJ/cm approximately. That level of energy density is sufficiently low to ensure that no problems will arise with regard to the light energy withstanding capabilities of the bundle of optical fibers 5. Each of the laser beams thereby emitted from the emission ends 6 of the bundle of fibers 5 is then condensed by the factor ½, so that the energy density is increased by 4 times. Taking into account the transmission losses (approximately 15%) in the quartz fibers which constitute the bundle of optical fibers 5, and in the converging lenses 27 (approximately 20%), the energy density of each laser beam when incident on the corresponding one of the workpieces 28 will be approximately 550 mJ/cm, i.e. will be greater than 500 mJ/cm.

Such a level of energy density is sufficient for cutting holes in workpieces such as circuit boards formed of a material such as polyamid.

In the same way as for the first embodiment, tests were performed on an actual apparatus configured in accordance with the second embodiment. In that apparatus, the laser oscillator 1 of is an XeCl laser having an oscillation wavelength of 308 nm, so that transmission losses within the quartz fibers will be sufficiently low. The pulse repetition rate of the laser beam is 500 Hz, with 21 W of laser power, and tests were performed to cut holes in respective workpieces consisting of polyamid plates, each 100 m thick. It was found possible to cut each hole in a time of 1 second, i.e. a total of 100 holes are cut simultaneously in 1 second. Thus, the processing speed is approximately 34 times that of the prior art example of FIG. 1, which would require 34 seconds to cut 100 holes in such workpieces. Furthermore, using the same reasoning as for the first embodiment, the operating cost of the second embodiment would be approximately 1/34 times that of the prior art apparatus of FIG. 1.

With the second embodiment, the converging lenses 27 preferably provide a laser beam condensing factor of ½, and can have a value of numerical aperture as small as 0.1. Thus, these lenses can have a simple optical design, and be inexpensive.

Figure 11A:
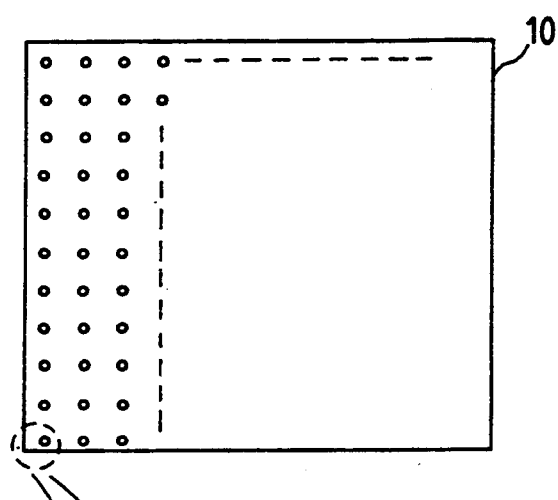
FIGS. 11(a) and (b) illustrates a variable diaphragm suitable for application to a plurality of emitted laser beams obtained from the first or second embodiments.
Figure 11B:
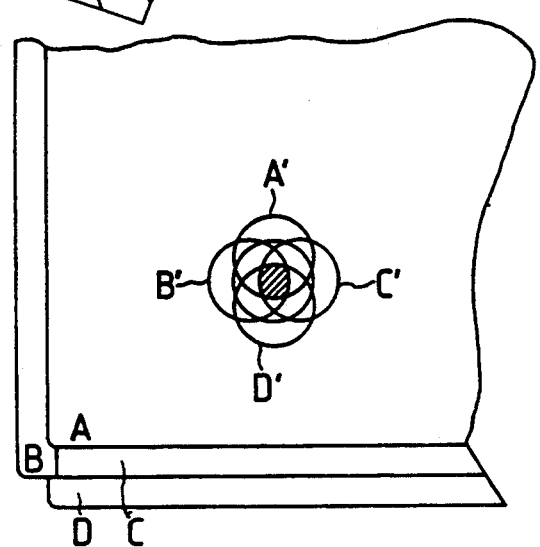

It may be necessary to form, in each of the workpieces 28, a pattern of holes which are of differing size. That can be achieved by providing a mask plate having respective apertures of variable size formed therein, disposed immediately after the emission ends 6 of the bundle of fibers 5 in the optical path, i.e. in which the apertures are respectively positioned in accordance with the positions of the emission ends 6 of the bundle of fibers 5, and each transfer a variable portion of the corresponding one of the laser beams emitted from the emission ends 6 of the bundle of fibers 5. FIG. 11 illustrates a multi-aperture variable diaphragm (referred to in the following simply as a variable diaphragm) 10 which is suitable for that purpose. The variable diaphragm 10 is formed of a set of superimposed plates, designated as A, B, C, D, which are mounted to be capable of sliding with respect to one another, and which in combination define an array of apertures as illustrated in diagram (a) of FIG. 11. Each of these plates has an array of apertures corresponding to the respective positions of the variable diaphragm 10, and with each of these apertures having a diameter that is substantially identical to that of each of the split laser beams emitted from the optical fibers 5. The plates are moved with respect to one another by a mechanism which is omitted from the drawing for simplicity of description and which can be controlled by computer in the same way as for the workpiece carrier 19. The variable diaphragm 10 is mounted with respect to the emission ends 6 of the bundle of fibers 5 such that when the four plates A, B, C, D are positioned in exact register with one another so that the apertures formed by the variable diaphragm 10 are of maximum size, the laser beams emitted from the emission ends 6 of the bundle of fibers 5 will pass through the corresponding apertures in each of the plates A, B, C, D without obstruction. However by mutually laterally shifting the plates A, B, C, D the effective size of each aperture in the variable diaphragm 10 will be decreased from the maximum size. This is illustrated in diagram (b) of FIG. 11, in which respective partially overlapping apertures in the four plates A, B, C, D are designated as A', B', C' and D'. Although the shapes of the reduced-size apertures thus formed are not precisely circular, the shapes could be made more closely circular by using a greater number of plates to constitute the variable diaphragm 10.

By applying computer control to vary the effective size of the apertures in the variable diaphragm 10 in accordance with a control program which also determines successive step changes in position of the workpiece carrier 19, to thereby successively change the aperture size of the variable diaphragm 10 at appropriate steps, it becomes possible to form an identical pattern of holes of varying sizes in each of the workpieces 28.

Each of the optical fibers 5 has a central core (through which the laser light is actually transmitted) which is surrounded by a cladding layer. Where two lengths of optical fiber have been joined, the junction position of the cores will be surrounded by a suitable junction material. The cladding portions of the incidence ends 4 of the bundle of fibers 5, or the junction material, are more susceptible to damage by the high-intensity laser beam than the fiber core. For that reason, it may be preferable to provide a mask plate which is disposed closely adjacent to the incidence ends 4 of the fibers 5, having respective apertures formed therein at positions respectively corresponding to the cores and having a diameter size identical to the core diameter. This will prevent damage from the effects of the high-intensity laser beam. Such a mask plate can be applied to either or both of the first and second embodiments described above.

It can be understood that each of the first and second embodiments described above enables a high speed of hole-cutting processing and low operating cost to be achieved.

Figure 12:
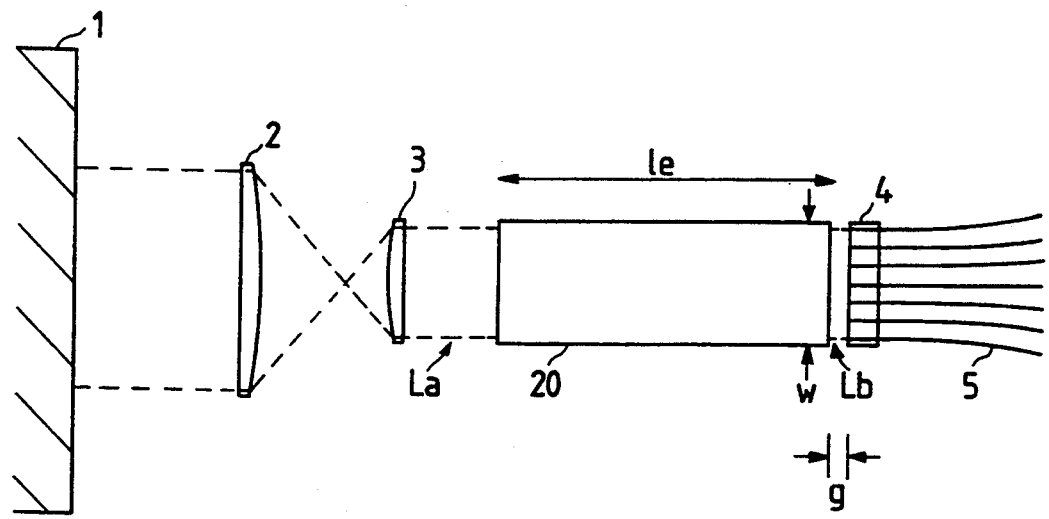
FIG. 12 is a partial view of a third embodiment of a laser processing apparatus according to the present invention, which differs from the second embodiment by further including a beam scrambler, for ensuring uniformity of energy density of respective split laser beams emitted by the apparatus.

A third embodiment of a laser processing apparatus according to the present invention will be described referring to FIG. 12. This is essentially a modification of the second embodiment of FIG. 9 described above, and for that reason only the modified portion of the apparatus is shown in FIG. 12. In FIG. 12, numeral 20 denotes a beam scrambler, for achieving uniformity of energy density distribution of the laser beam that is directed onto the incidence ends 4 of the bundle of fibers 5. The beam scramber 20 is a straight elongated rod, formed of a transparent material such as quartz, and is disposed between the second lens 3 of the condensor lens pair 2, 3 and the incidence ends 4 of the bundle of fibers 5. Other than with regard to incorporating the beam scramber 20, this third embodiment is identical in configuration and operation to the second embodiment described above. The cross-sectional shape of the beam scramber 20 is determined in accordance with that of the incidence ends 4 of the bundle of fibers 5. If it is assumed that as for the second embodiment described above, the incidence ends 4 of the bundle of fibers 5 are formed to a rectangular shape of 2.7 mm by 4.6 mm, then the beam scramber 20 should have similar cross-sectional dimensions.

With this embodiment, the laser beam emitted from the laser oscillator 1 enters the beam scramber 20 after being condensed by the lens pair 2, 3 to a cross-sectional area which is smaller than that of the beam scramber 20. If the beam scramber 20 is of suitable length, then the laser beam will repetitively be reflected internally within the beam scramber 20, so that the light is effectively mixed, and the energy density distribution becomes uniform across the beam cross-sectional area. The resultant laser beam emitted from the beam scramber 20 then enters the incidence ends 4 of the bundle of fibers 5, to be used in laser beam processing as described for the preceding embodiments.

Use of the beam scramber 20 has the advantage, by comparison with the preceding embodiments, that the respective laser beams which are transferred through the converging lenses 27 to the workpieces 28 will be mutually identical in energy density, so that greater precision and uniformity of processing (e.g. greater uniformity of diameter of holes cut in the workpieces) can be achieved.

Figure 3:
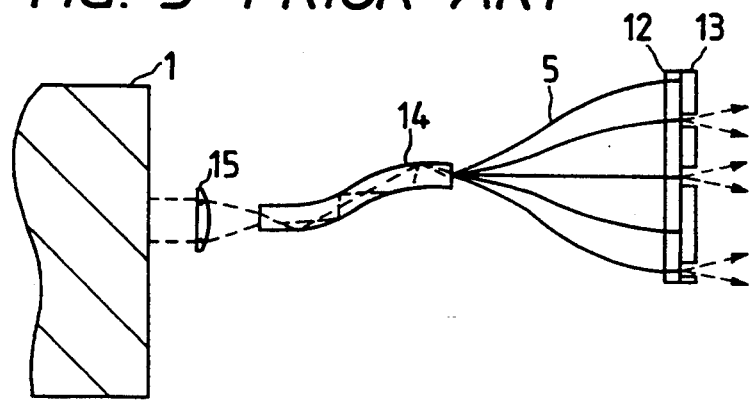
FIG. 3 illustrates a third example of a prior art laser processing apparatus, in which a laser beam is split among a plurality of optical fibers, to be transmitted through respective apertures in a mask to a plurality of locations on a workpiece.
Figure 4:
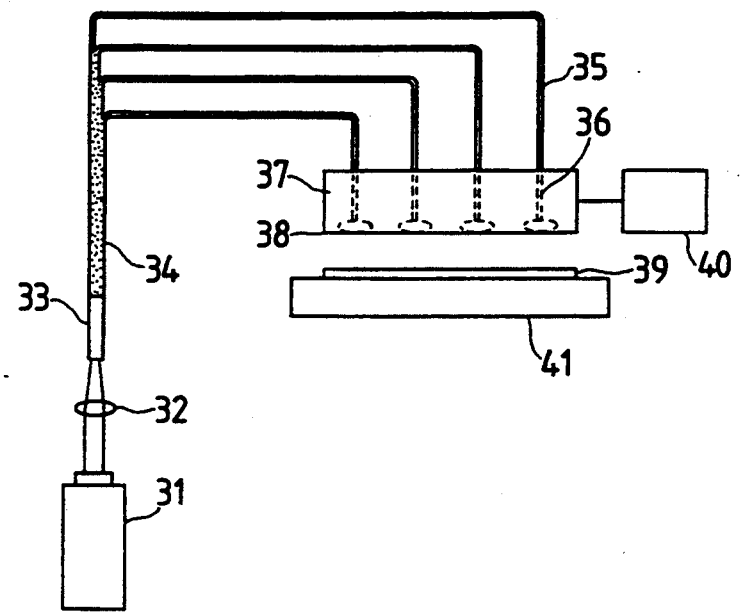
FIG. 4 illustrates a fourth example of a prior art laser processing apparatus, in which a laser beam is split among a plurality of optical fibers, to be transmitted to pass through respective converging lenses which are focus-adjusted in common, to be incident on respective locations on a workpiece.
Figure 5:
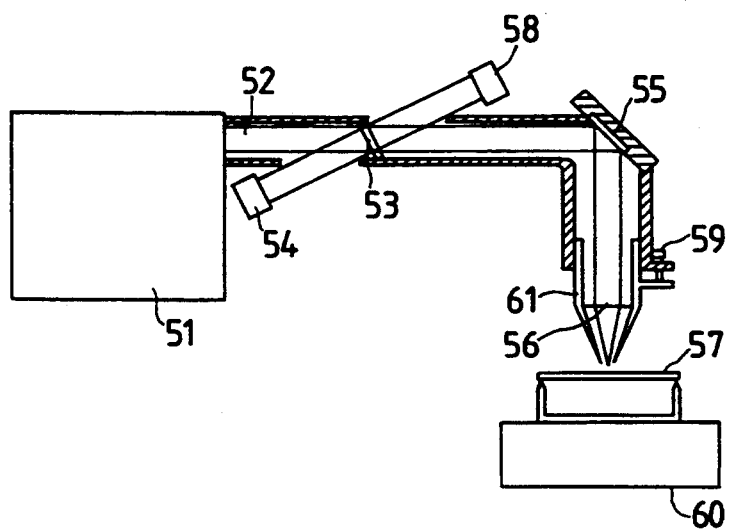
FIG. 5 illustrates a fifth example of a prior art laser processing apparatus, in which a converging lens is mounted within an adjustable portion of a processing head, for adjustment of focus of a laser beam which is incident on a workpiece.

As described in reference to the first and second embodiments hereinabove, it is necessary that the angle of divergence of each laser beam emitted from the emission ends 6 of the bundle of fibers 5 be no greater than 0.1 radians, so that it is necessary that the angle of divergence of the laser beam that is incident on the incidence ends 4 of the bundle of fibers 5 must be no greater than 0.1 radians. Thus with the third embodiment, it is necessary that the angle of divergence of the laser beam be no greater than 0.1 radians at exit from the lens 3. With the prior art beam scrambler 14 of FIG. 3, which is formed in a curved shape, the angle of divergence of the laser beam that is emitted from the beam scrambler 14 is substantially increased by comparison with the angle of divergence of the original laser beam, as has been shown hereinabove by applying equation (1) to that beam scrambler 14. For that reason, such a prior art beam scrambler 14 cannot satisfy the necessary angle of divergence conditions set out above. However since the beam scramber 20 of the third embodiment is not curved (i.e. the radius of curvature is effectively infinite), by applying equation (1) to the beam scramber 20, it is clear that the angle of divergence of the laser beam emitted from the beam scramber 20 (designated as Lb in FIG. 12) will be identical to that of the laser beam emitted from the lens 3 (designated as La), i.e. will be identical to the angle of divergence of the original laser beam.

Since the laser beam that enters the beam scramber 20 must be reflected internally a number of times, it is necessary that the length of the beam scramber 20 must satisfy the following condition:

$$l_e > 10 \cdot w$$

Here, w and $l_e$ respectively denote the diameter and the length of the beam scramber 20 (assuming a cylindrical shape). The above relationship constitutes the necessary condition whereby a laser beam having an angle of divergence of no greater than 0.1 radians must undergo at least one complete reflection within the beam scrambler 20.

In addition, to ensure that the laser beam emitted from the beam scrambler 20 will be incident on the incidence ends 4 of the bundle of fibers 5 with a minimum of loss of radiation due to the beam divergence, i.e. to ensure efficient transfer of the beam into the incidence ends 4 of the bundle of fibers 5, the spacing (indicated as g in FIG. 12) between the incidence ends 4 of the bundle of fibers 5 and the emission end of the beam scramber 20 should be smaller than the diameter w of the beam scramber 20.

Figure 13:
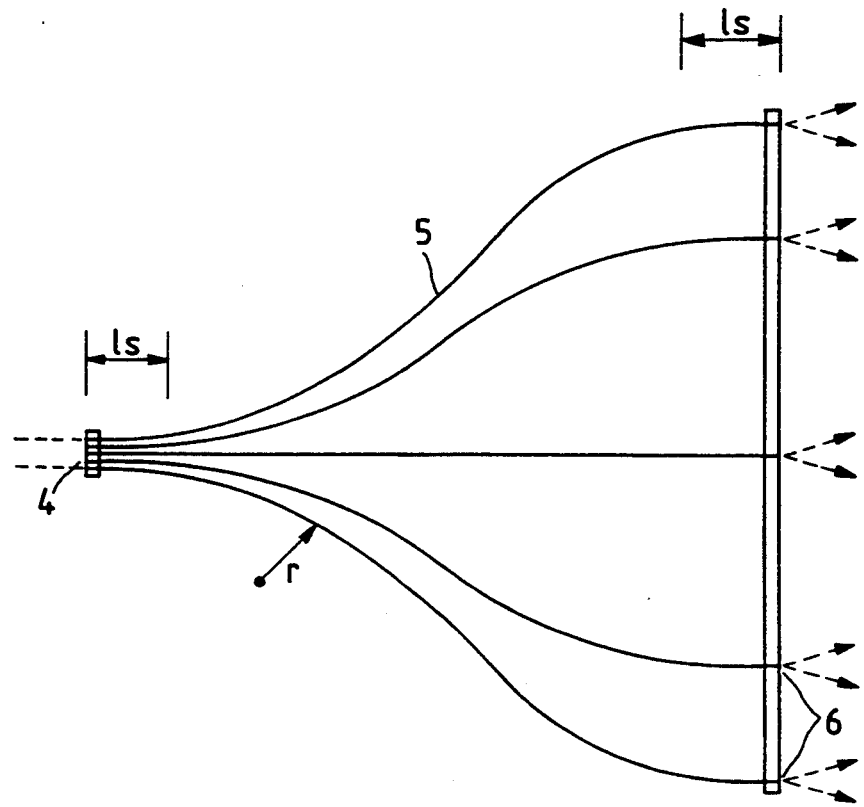
FIG. 13 is a cross-sectional view of a bundle of optical fibers for use as a laser beam splitting and transmission device, for defining respective curvature and straight-length portion parameters of the optical fibers.

Preferred design conditions for the bundle of optical fibers 5 will now be described which are common to each of the first, second and third embodiments described above, and which ensure that the angle of divergence of each laser beam emitted from the emission ends 6 of the fibers 5 will be no greater than 0.1 radians. These conditions will be described referring to FIGS. 13 to 16. The following description does not assume the specific design conditions which were specified hereinabove for the bundle of optical fibers 5 of the first and second embodiments, i.e. whereby the distance between the incidence and emission ends of the optical fibers 5 is at least 1.5 times the maximum separation distance h shown in FIG. 10, whereby the laser beam incidence direction Li and emission direction Lo are parallel, whereby each of the optical fibers has mutually opposite directions of curvature on respective sides of a point situated at the center of the optical fiber, and whereby the incidence side tangent Mi and the emission side tangent Mo at that central point mutually coincide. Instead, the following only assumes that for each fiber of the bundle of optical fibers 5, the fiber is formed with a straight portion (of length designated as ls in FIG. 13) extending from the incidence end of the fiber, which is followed by a portion curved in an arc of a circle, and is similarly formed with a straight portion (ls) extending from the incidence end of the fiber, which is followed by a portion curved in an arc of a circle but in the opposite direction of curvature to the first-mentioned curved portion. The point of inflection between the two directions of curvature occurs at some arbitrary position along the fiber. In FIG. 13, which shows the configuration of the bundle of optical fibers 5, numerals 4 and 6 respectively designated the incidence ends and emission ends of the bundle of optical fibers 5, as in FIG. 10. The minimum radius of curvature of each fiber of the bundle of optical fibers 5 is indicated as r.

Figure 14:
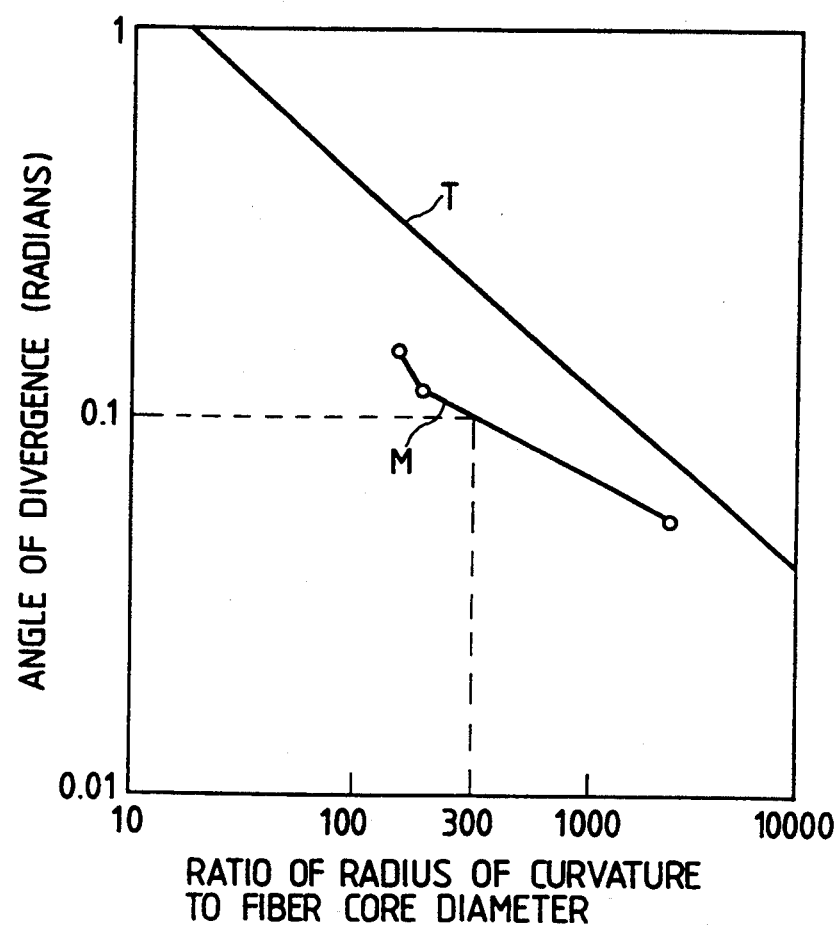
FIG. 14 and FIG. 15 are graphs illustrating relationships between minimum radius of curvature of the optical fibers of FIG. 13, diameter of the optical fibers, and angle of divergence of laser beams which are emitted from the optical fibers.
Figure 15:
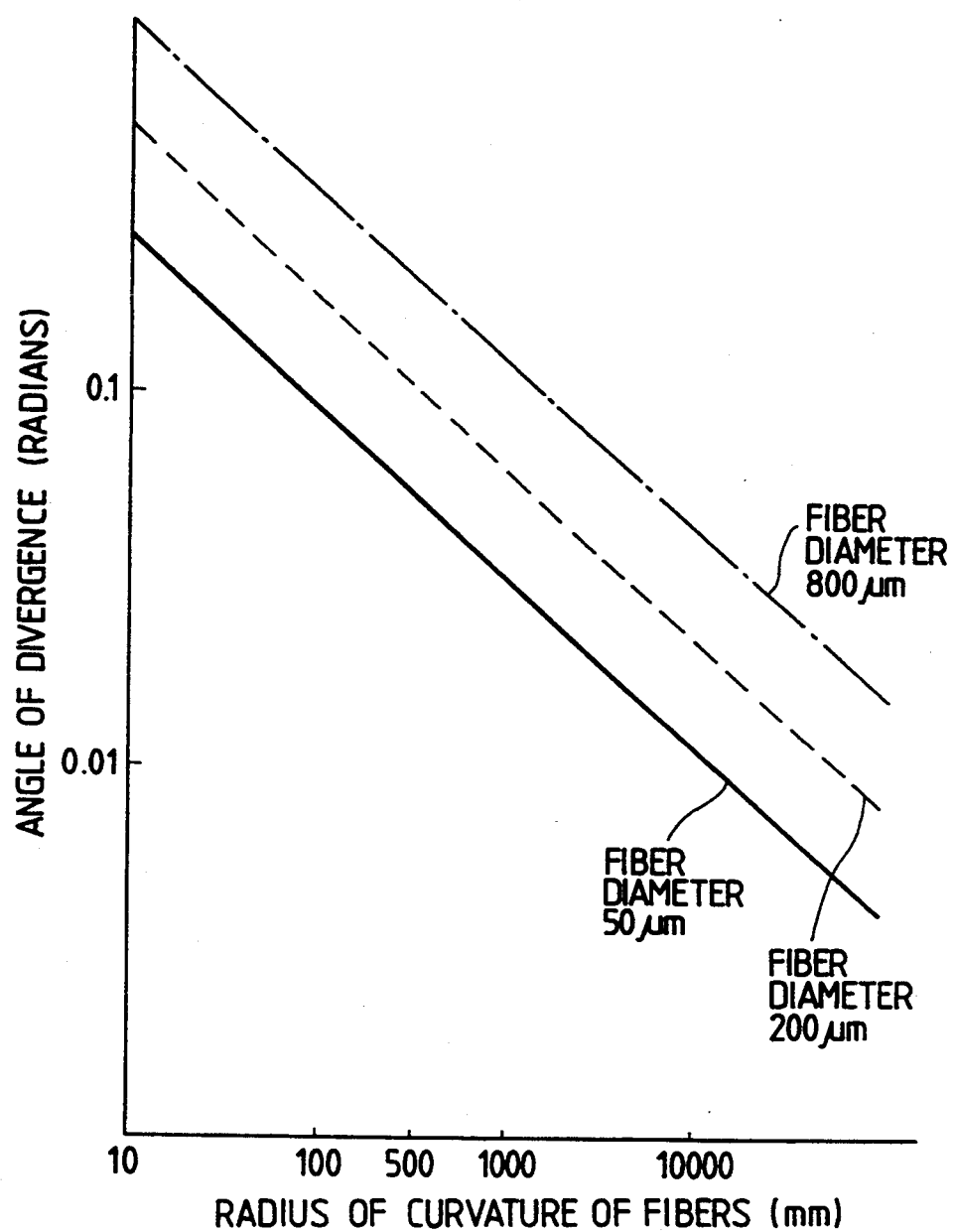

In FIG. 14, values of minimum radius of curvature of each optical fiber 5 divided by the fiber core diameter are plotted along the horizontal axis, while values of angle of divergence of each laser beam emitted from the emission ends 6 of the fibers 5 are plotted along the vertical axis. FIG. 15 shows similar graphs, illustrating the (theoretically derived) relationships between radius of curvature of an optical fiber and resultant angle of divergence of the emitted laser beam from the fiber, for three different values of core diameter.

Figure 16:
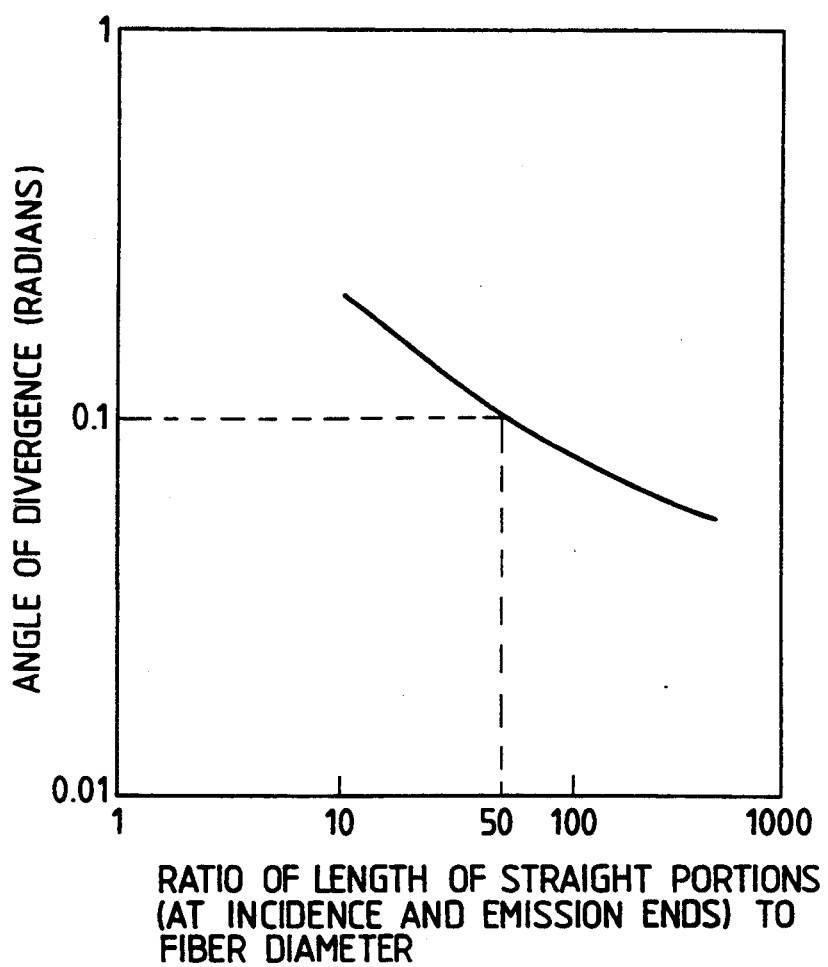
FIG. 16 is a graph illustrating a relationship between a value of length of straight portions of the optical fibers of FIG. 13 and angle of divergence of laser beams which are emitted from the optical fibers.

In FIG. 16, values of length (ls) of the aforementioned straight portions of each fiber 5, divided by the fiber core diameter, are plotted along the horizontal axis, while values of laser beam angle of divergence at the emission ends 6 of the fibers 5 are plotted along the vertical axis, and a relationship that has been found between these is shown as a graph.

As described hereinabove, it is necessary that the angle of divergence of each laser beam from the emission ends 6 of fibers 5 should be no greater than 0.1 radian, to ensure that it does not become necessary to use large-diameter, costly lenses for respectively condensing the laser beams emitted from the optical fibers 5. Moreover as described hereinabove, use of such lenses would result in laser beams being produced which are shaped such that a hole which is cut through a relatively thick workpiece would have entry and exit diameters which are substantially mutually different.

In FIG. 14, the graph designated as T shows a theoretical relationship between the angle of divergence from the emission ends 6 of the bundle of fibers 5 and values of radius of curvature r normalized to the fiber core diameter, while M is a graph of actual test results which were obtained for that relationship. In each case, results were obtained on the assumption that the angle of divergence of the laser beam that is incident on the incidence ends 4 of the fibers 5 is no greater than 0.1 radians. As can be seen, there is good agreement between the theoretical values and the test results, and show that it is necessary for the ratio of radius of curvature to core diameter to be more than 300 in order to ensure that the angle of divergence from the emission ends 6 of the bundle of fibers 5 will be no greater than 0.1 radians. That is, the minimum radius of curvature of the optical fibers must be at least 300 times the diameter of the fiber core.

The curvature of the fibers in the bundle of optical fibers 5 not only affects the angle of divergence of the laser beams emitted from the fibers, but also determines whether the emitted beams will exit obliquely. For that reason, it is necessary to form each fiber with at least one of the aforementioned straight portions, i.e. extending from the incidence ends 4 of the bundle of fibers 5 or extending from the emission ends 6 of the bundle of fibers 5. Preferably, each optical fiber is formed with respective straight portions at each of these ends, as illustrated in FIG. 13. The length of each of these straight portions (assumed to be respectively identical) is designated as ls in FIG. 13.

As shown by the graph of FIG. 16, in order to ensure that the angle of divergence of the laser beams from the emission ends 6 of the bundle of fibers 5 is held to within 0.1 radians, the ratio of linear portion length (ls) to core diameter of the optical fibers must be more than 50 times.

It should be noted that although it has been assumed that an excimer laser is used in the above embodiments, the invention is not limited to such a laser beam. In general, the wavelength of the laser beam to be used should be appropriately selected in accordance with the type of material that is to be processed, i.e. should be selected such that the workpiece material has a sufficiently high absorption coefficient with respect to the laser beam. This will ensure that efficient processing at low manufacturing cost can be achieved.

Furthermore in the case of processing using a pulsed laser beam source, it has been found that highly precise cutting can be achieved if the pulses are of very short duration. This is due to the fact that with very brief laser beam pulses, regions of the workpiece which are closely adjacent to a region that is being processed by the beam will not be affected by heat transfer. This is a basic advantage of such a laser beam source.

If the laser beam wavelength is longer than 190 nm, then it is advantageous to use quartz fibers as the optical fibers, as in the above embodiments, since such fibers have a high degree of transparency, and provide high stability for the beam splitter and transmission element.

Moreover if a laser beam wavelength of longer than 190 nm is used (extending further into the ultraviolet range) then there will be a greater variety of suitable workpiece materials, i.e. materials which display high absorption of the laser beam. The excimer laser provides an exceptionally high level of output power, among the different types of ultraviolet emission lasers. In particular, the gaseous haloid type of excimer laser has the advantage of high stability together with high output power, and hence is an excellent laser beam source for such processing applications, and is exceptionally suited to the present invention.

Figure 17:
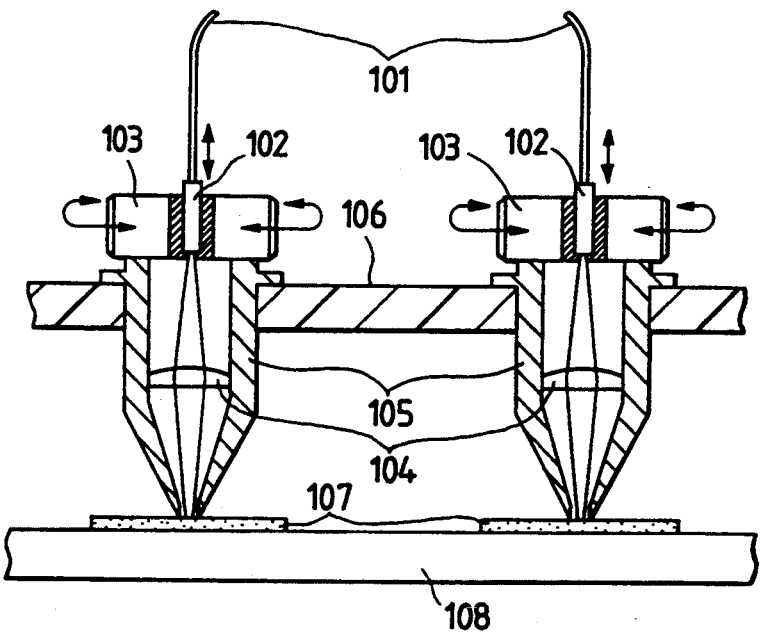
FIG. 17 is a partial cross-sectional view of a fourth embodiment of a laser processing apparatus according to the present invention, wherein individual focus adjustment of processing heads is executed by movement of emission ends of optical fibers which enter the processing heads.

FIG. 17 is a partial cross-sectional view of a fourth embodiment of a laser processing apparatus according to the present invention. With this apparatus, an original laser beam is divided into a plurality of split laser beams which are transmitted through respective ones of a plurality of optical fibers, and focused on respective workpieces by respective converging lenses, as described for any of the preceding embodiments. However only the parts of the apparatus associated with two processing heads each designated by numeral 105, which serve to couple the emission ends of two of the optical fibers to the corresponding converging lenses, are shown. The optical fibers are designated by numeral 101, with each emission end of the optical fibers being fixedly retained in a corresponding optical fiber holder 102. Each optical fiber holder 102 is movable in the vertical direction and is coupled to a corresponding adjustment mechanism 103, which is rotatable for adjusting the vertical position of the optical fiber holder 102. Each adjustment mechanism 103 is configured such as to permit very precise adjustment in the vertical position of the corresponding optical fiber holder 102, by executing small amounts of rotation of the adjustment mechanism 103. A laser beam emitted from the emission end of each optical fiber 101 passes through a corresponding converging lens 104, which is fixedly mounted within a corresponding processing head 105. Each processing head 105 is fixedly mounted in a processing head holder 106 as shown. Respective workpieces are designated by numeral 107, with each workpiece being supported on a table 108, which is movable only in the horizontal direction.

Each adjustment mechanism 103 is mounted to be coaxial with the axis of the laser beam that is emitted from the corresponding optical fiber 101.

Before beginning a processing operation with the apparatus of FIG. 17, the table 108 is adjusted 2-dimensionally by a control apparatus which is not shown in the drawing (i.e. moved in the horizontal plane, as seen in FIG. 17), to set each workpiece 107 at a specific position with respect to the corresponding processing head 105 in accordance with predetermined position data. That is, as for the preceding embodiments, the table 108 can be computer-controlled for stepwise position adjustment of the workpieces prior to each new processing operation. Each of the emission ends of the optical fibers 101 is then adjusted in vertical position, i.e. along the direction of the optical axis of the corresponding lens 104, by rotational adjustment of the corresponding adjustment mechanism 103, to execute individual focus adjustment for each processing head 105.

Such focus adjustment is performed by moving only the emission ends of the optical fibers 101, with the remaining parts of each processing head 105, and the workpiece table 108 being held fixed in position. Since individual focus adjustment can be performed for each of the optical fibers, this embodiment overcomes the disadvantages of prior types of apparatus in which the workpiece table is adjusted vertically in order to execute focus adjustment, or in which all of the processing heads are vertically shifted in common, when performing focus adjustment. That is to say, individual focus adjustment can be performed to compensate for the effects of manufacturing deviations which can affect the respective positions of the lenses and the emission ends of the optical fibers, the effects of variations in shape of the workpieces 107, differences in the conditions of mounting the respective workpieces 107 on the table 108, etc.

Such adjustment, performed prior to executing a laser processing operation, of course cannot compensate for any effects which may result from changes in shape of the workpieces 107 that may result from the action of the laser beams on the workpieces. However in practice, the effects of such changes on the focus condition can be ignored, since they are very small by comparison with the total amount of focus error that would result (from the various sources of deviation described above) if such individual focus adjustment for the respective laser beams is not performed.

With this embodiment, since focus adjustment is performed by moving only the emission ends of the optical fibers, leaving the converging lenses and the workpiece fixed in position, the apparatus can have a very simple configuration and so can be manufactured at low cost. However the apparatus enables extremely precise focus adjustment to be achieved.

Figure 18:
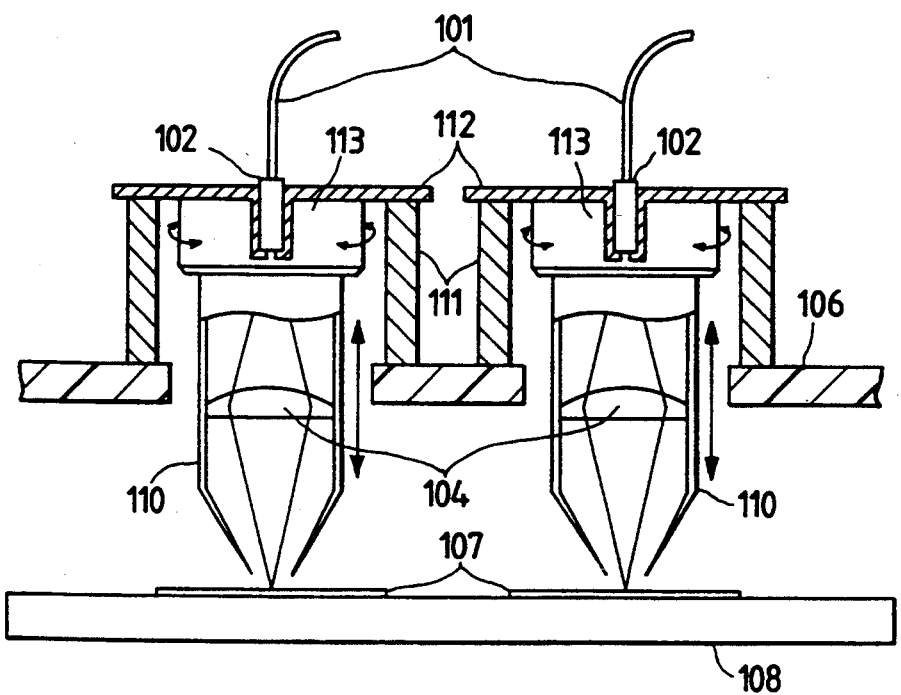
FIG. 18 is a partial cross-sectional view of a fifth embodiment of a laser processing apparatus according to the present invention, wherein individual focus adjustment of processing heads is executed by movement of adjustable lower portions of the processing heads.

FIG. 18 is a partial cross-sectional view of a fifth embodiment of a laser processing apparatus according to the present invention. This is a split-beam apparatus having multiple processing heads, as for the preceding embodiment. For simplicity of description, only the parts of the apparatus associated with two of the processing heads are shown. The optical fibers which transmit the split laser beams are designated by numeral 101, with each emission end of the optical fibers being fixedly retained in a corresponding optical fiber holder 102. Numeral 112 denotes respective optical fiber attachment plates which serve, in conjunction with support plates 111, to fixedly attach the optical fiber holders 102 to a processing head holder 106. Workpieces 107 are supported on a table 108, which is movable in the horizontal direction (as seen in FIG. 18) for positioning the workpieces 107 in a predetermined manner with respect to respective processing heads 110. Each processing head 110 has a corresponding converging lens 104 fixedly mounted therein, for focusing the laser beam emitted from the corresponding optical fiber 101. Each of the processing heads 110 is movable in the vertical direction (i.e. along the optical axis of the corresponding converging lens 104), with the vertical position of each processing head 110 being adjustable by a corresponding adjustment mechanism 113. That is to say, the mechanism 113 is coupled to the processing head 110 such as to enable adjustment along the optical axis of the relative positions of each emission end of a fiber 101 and the corresponding converging lens 104, by rotation of the adjustment mechanism 113 as indicated by the arrows in FIG. 18. Individual adjustment of the focusing condition of each of the laser beams of the respective processing heads 110 can thereby be performed by rotation of the adjustment mechanisms 113.

It can be understood that this embodiment provides similar advantages to the fourth embodiment described above, since each of the plurality of laser beams produced by the respective processing heads can be individually adjusted in focus. That is to say, the various sources of focusing error, e.g. manufacturing variations in components of the laser processing apparatus, variations in the condition of mounting respective workpieces 107 on the table 108, etc., can be compensated for. As for the fourth embodiment, the focus condition of each processing head can be adjusted very precisely, by rotation of the adjustment mechanisms 103.

Figure 19:
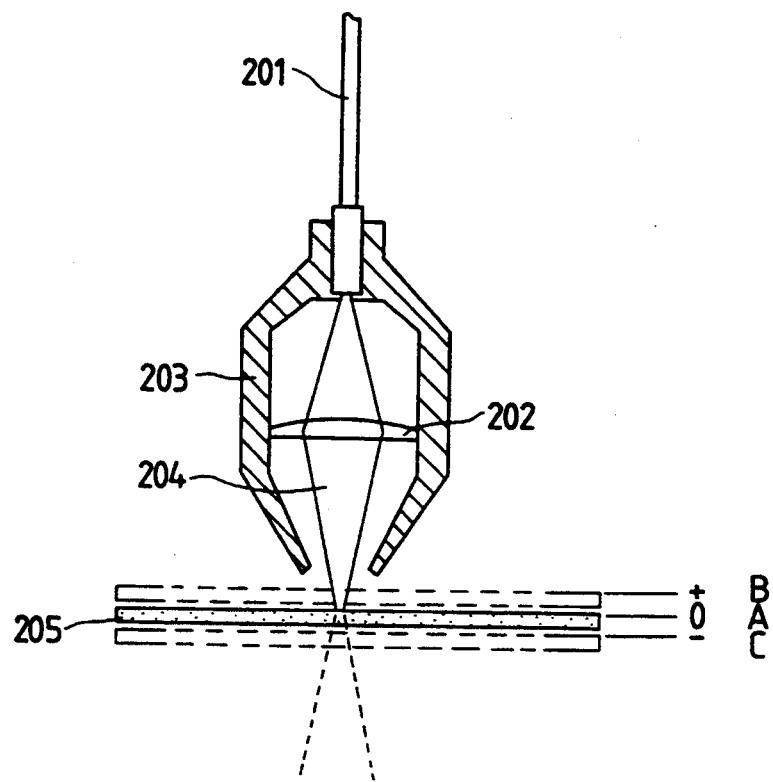
FIG. 19 is a cross-sectional view of a processing head of a sixth embodiment of a laser processing apparatus according to the present invention, for illustrating a relationship between position of a workpiece, focal position of a converging lens which focuses a laser beam, and varying shapes of holes which are cut in the workpiece by the beam.

FIG. 19 is a partial cross-sectional view of a sixth embodiment of a laser processing apparatus according to the present invention. As for the preceding embodiments, this embodiment includes a plurality of optical fibers for transmitting respective split laser beams derived from an original laser beam, through respective converging lenses onto a plurality of workpieces. Only one of the optical fibers and the corresponding converging lens are shown in FIG. 19, designated by numerals 201, 202 respectively. The converging lens 202 is mounted within a processing head 203, and the laser beam 204 which is emitted from the optical fiber 201 is focused by the lens 202 to fall on an upper surface of a workpiece 205. In the following description, it should be understood that changes in position of the workpiece 205 with respect to the optical axis of the converging lens 202 are relative changes, and could be produced by movement along the optical axis of the converging lens 202 of the emission end of the optical fiber 201, of the converging lens 202, or of the workpiece 205.

When such an apparatus is used to cut a hole through the workpiece 205, it is found that the cross-sectional size of the hole will vary in dependence on the position of the workpiece 205 with respect to the focal position of the converging lens 202. The term "focal position" of a lens, as used herein, signifies the position of the focal plane of the lens on the focal axis. It will be assumed in the following that the laser beam 201 is circular in cross-section. Three possible positions for the workpiece 205 along the optical axis of the converging lens 202 (i.e. along the vertical direction as seen in FIG. 19) as shown, designated as positions A, B and C respectively. It is an essential feature of this embodiment that, prior to laser beam processing, the focus condition of the laser beam 204 is adjusted such that the upper surface of the workpiece 205 is positions slightly beyond the focal position of the lens 202, on the opposite side of that focal position from the lens 202 i.e. so that the upper surface is on the "−" side of the focal position as indicated in FIG. 19 (the focal position being indicated as the "0" position).

Figure 20A:
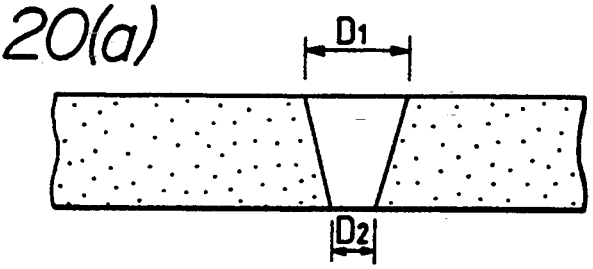
FIGS. 20(a), (b) and (c) shows diagrams corresponding to FIG. 19, illustrating respective shapes of holes cut in a workpiece, resulting from variations of workpiece position in relation to focal position of the converging lens.
Figure 20B:
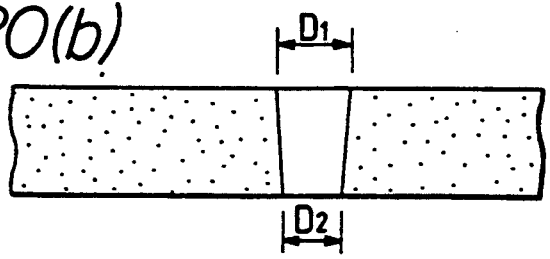
Figure 20C:
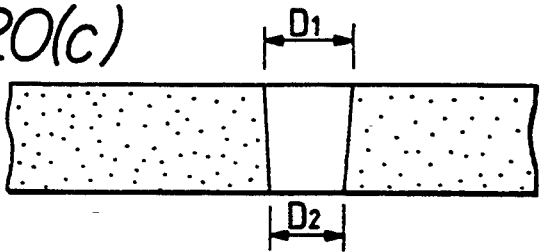

In FIG. 20, diagrams (a), (b) and (c) illustrate the cross-sectional size of a hole which is cut in the workpiece 205 by the action of the laser beam 204, for the cases of positions B, A and C of FIG. 19 respectively. In the case of position A, in which the laser beam 204 is focused to have the smallest possible diameter when incident on the workpiece 205 (i.e. the upper surface of the workpiece 205 is set at the focal position of the converging lens 202), it is found that the diameter D1 of the upper end of the hole is slightly larger than the diameter D2 of the lower end of the hole. If the workpiece is positioned slightly above the focal position of the converging lens 202 (e.g. at position B in FIG. 19) then as shown in diagram (a) in FIG. 20, the diameter D1 of the upper end of the hole will be substantially greater than the diameter D2 of the lower end. Specifically, in this case the value of D1 will be substantially greater than that for the case of position A, whereas the value of D2 will be substantially smaller than that for the case of position A.

If the workpiece 205 is positioned slightly lower than the focal position of the converging lens 202 (e.g. at position c in FIG. 19) then as shown in diagram (c) in FIG. 20, the diameter D1 of the upper end of the hole and diameter D2 of the lower end are both increased by comparison with the position A. However there is only a small difference between the values of D1 and D2 in this case.

Figure 21:
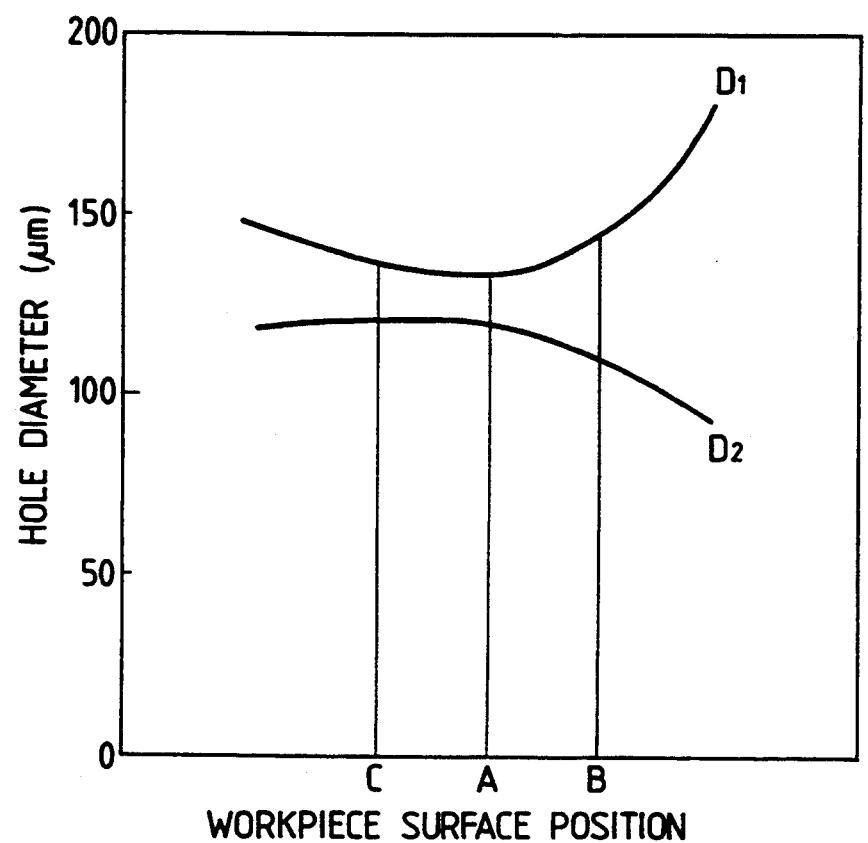
FIG. 21 is a graph corresponding to FIG. 19, illustrating variations in upper and lower diameter values of holes cut in a workpiece, resulting from variations of workpiece position in relation to focal position of the converging lens.

FIG. 21 shows graphs which illustrate variations in the respective diameters D1 and D2 with respect to changes in the position of the workpiece 205 along the optical axis of the converging lens 202. Increasing values of position (from left to right) along the horizontal axis in FIG. 21 correspond to shifting of the workpiece 205 along the optical axis of the lens 204 towards the lens (i.e. upward displacement, in FIG. 19), and the positions A, B, C of FIG. 21 are indicated. The graphs of FIG. 21 have been derived for the case in which the optical fiber 201 has a core diameter of 0.4 mm, and the converging lens 202 produces a condensing factor of approximately ⅓. As can be seen for FIG. 21, as the upper surface of the workpiece 205 is increasingly positioned higher than the focal position of the converging lens 202 (i.e. on the + side) then the ratio of the upper-end diameter D1 to the lower-end diameter D2 of the hole accordingly tends to become extremely large. Conversely as the workpiece position is moved lower than the focal position of the lens 202 (i.e. on the − side), then the respective sizes of the diameters D1 and D2 will exhibit relatively little change, with the ratio of the diameters tending to increase only gradually. It can thus be understood that if the focal position of the converging lens 202 is positioned between the lens 202 and the upper surface of the workpiece 205, adjacent to that upper surface, then errors in the actual position of the workpiece with respect to that focal distance will have a smaller effect than is the case when the focal position is (nominally) at the workpiece upper surface. Such position errors can result from a variety of causes, e.g. incorrect adjustment of the lens focus, varying conditions of mounting the workpiece 205 on a supporting body, etc. However FIG. 21 illustrates the fact that the effects of such errors can be substantially decreased, by positioning the workpiece slightly lower than the focal position of the converging lens 202.

Thus, with this embodiment, due to the fact that the working surface of the workpiece 205 is positioned slightly beyond the focal position of the lens 204, the requirements for extremely precise focusing adjustment of the lens 204, and for careful mounting of the workpiece 205 on a supporting member to avoid positioning errors, can be substantially relaxed.

It will be apparent that the principles of the above embodiment can be applied to each of the preceding embodiments described hereinabove.

Figure 22:
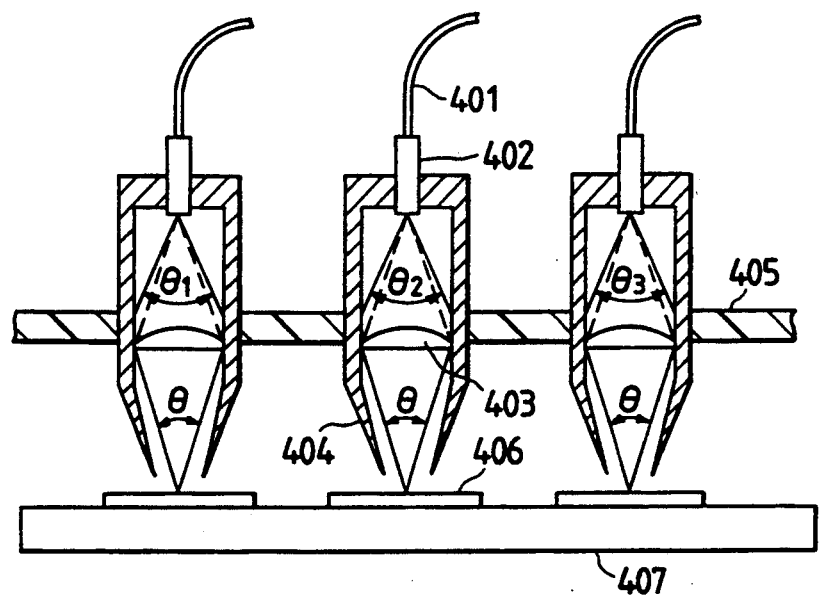
FIG. 22 is a partial cross-sectional view of a seventh embodiment of a laser processing apparatus according to the present invention, showing processing heads provided with respective converging lenses for focusing respectively laser beams, wherein peripheral rays of the laser beams are shielded from reaching the converging lenses.

FIG. 22 is a partial cross-sectional view of a seventh embodiment of the present invention. This is a split-beam laser processing apparatus having multiple processing heads, as for the preceding embodiments. For simplicity of description, only the parts of the apparatus associated with three of the processing heads are shown. Each processing head is denoted by numeral 404, with the processing heads 404 being fixed in a processing head holder 405, and each processing head having a corresponding converging lens 403 mounted therein as shown. The optical fibers which are coupled to each processing head 404 are designated by numeral 401, with each emission end of the optical fibers being fixedly retained in a corresponding optical fiber holder 402. As for the preceding embodiments, each processing head is positioned in a predetermined manner over a corresponding workpiece 406, the workpieces being supported on a table 407.

In FIG. 22 it is assumed that the laser beams emitted from the optical fibers 401 of the three processing heads 404 have respectively different values of angle of divergence, these values being designated as $\Theta_1$, $\Theta_2$ and $\Theta_3$. As described hereinabove referring to equation (1), the angle of divergence of a laser beam upon being emitted from an optical fiber will vary in accordance with variations in parameters such as the diameter and the minimum radius of curvature of the optical fiber. It can thus be expected that variations between the angular values $\Theta_1$, $\Theta_2$ and $\Theta_3$ will arise, due to manufacturing deviations. For that reason, it is an essential feature of this embodiment that each converging lens 403 is positioned with respect to the emission end of the corresponding optical fiber 401 such that the effective diameter of the lens is smaller than the unobstructed cross-sectional diameter of the laser beam at the position of the lens. The term "unobstructed cross-sectional diameter of the laser beam" is used here to signify the cross-sectional diameter to which the beam would diverge, in the plane of the converging lens 403, if the laser beam were unobstructed by the wall of the processing head. As a result, an outer part of the laser beam (i.e. outer rays of the beam, which are most strongly affected by changes in the angle of divergence) is blocked from passing through the converging lens. It has been found that this ensures that the angle of convergence from each converging lens 403 (designated as $\Theta$ in FIG. 22) becomes substantially identical for each of the converging lenses, irrespective of variations in the angle of divergence of the laser beams at emission from the optical fibers 401. As a result, greater uniformity of processing is obtained. For example, if respective holes are to be cut simultaneously in the workpieces 406 by the laser beams emitted from the processing heads 404, it is ensured that each of the holes will be of identical shape along the depth direction. With a prior art apparatus which emits laser beams of respectively varying convergence angle from the processing heads however, such holes would vary in shape, e.g. the lower ends of the holes would vary in diameter.

The above embodiment has thus been found to be highly effective in achieving greater uniformity of processing, when applied to simultaneous multi-beam processing by a plurality of processing heads equipped with respective converging lenses.

It will be understood that from the aspect of optimum efficiency of utilizing the laser beams emitted from the optical fibers 401, it would be appear preferable for all of the light emitted from each optical fiber 401 to enter the corresponding converging lens 403. However it has been found in practice that the amount of emitted light which is blocked from entering each lens 403 is insufficient to have any significant effect on the operation. For example, there is no significant reduction in hole-cutting speed. The advantages obtained by making the respective beam convergence angles mutually identical have been found to greatly outweigh any possible disadvantages.

An eighth embodiment of the invention will be described referring to FIG. 23. This is applicable to a split-beam laser processing apparatus having multiple processing heads, as for the preceding embodiments. For simplicity of description, a cross-sectional view of only one of the processing heads is shown, designated by numeral 503. This embodiment is directed to a laser processing apparatus in which an assist gas (as described hereinabove) is ejected through an aperture in each processing head, onto a workpiece region where the corresponding laser beam is incident. As described hereinabove, there is a requirement to minimize the rate of flow of such a gas through each of the processing heads, in order to economize manufacturing costs. In the prior art example of FIG. 7, that is achieved by making a lower nozzle portion of the processing head movable, and controlling the position of that nozzle portion such that a very narrow ejection aperture is held aligned with the axis of the laser beam.

Figure 23:
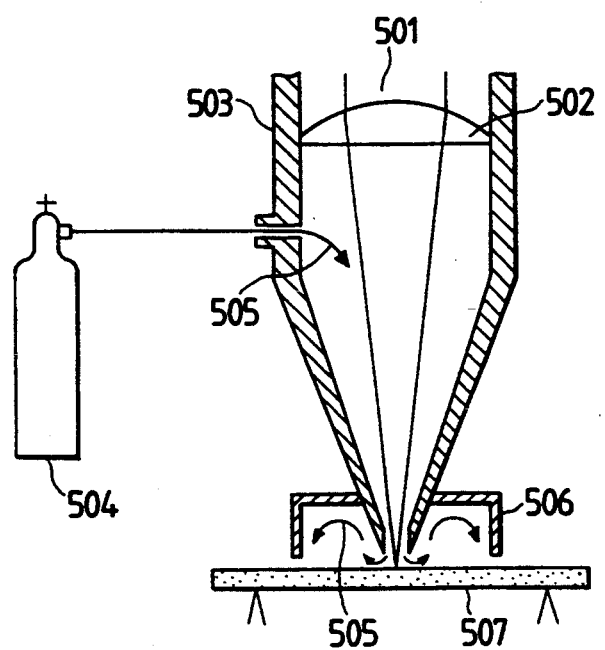
FIG. 23 is a cross-sectional view of a processing head of an eighth embodiment of a laser processing apparatus according to the present invention, wherein a gas is passed through the interior of the processing head to be ejected from a nozzle aperture, and the nozzle is provided with a peripherally surrounding cover.

In FIG. 23, the assist gas 505 flows from a tank 504 into the interior of the processing head 503, within which is mounted a converging lens 502, with the converging lens 502 acting to focus a laser beam 501 emitted from an end of an optical fiber (not shown in the drawing) onto a workpiece 507, as for the preceding embodiments. The lower end of the processing head is nozzle-shaped, having a tip aperture 508 through which the assist gas 505 is ejected onto the workpiece 507. The distinguishing feature of this embodiment is that a nozzle cover 506 is fixedly attached to the nozzle portion of the processing head 503. The nozzle cover 506 is shaped such as to entirely enclose a part of the nozzle of the processing head 503, i.e. a region which extends from the tip aperture 508 of the holder 503. The nozzle cover 506 is in the shape of an inverted cup having a central aperture through which the lower end of the processing head 503 protrudes. The lower circumferential face of the nozzle cover 506 is positioned in the same plane as the end of the nozzle tip of the processing head 503. Thus, that lower circumferential face of the nozzle cover 506 and the tip of the processing head 503 are both positioned very closely adjacent to the upper surface of the workpiece 507.

By utilizing such a cover 506, it is found that even if the tip aperture 508 of the processing head 503 is relatively wide and the rate of flow of the assist gas 505 is relatively low, the region of the workpiece 507 on which the laser beam is incident will remain effectively surrounded by an atmosphere of assist gas. This is due to the fact that (as illustrated by the arrows in FIG. 23) the assist gas 505, instead of becoming quickly mixed with atmospheric air immediately after being ejected from the tip aperture of the processing head 503, is retained for a time within the interior of the cover 506, before reaching the lower periphery of the cover 506 and starting to mix with the atmospheric air. Thus, even if the rate of flow of assist gas through the processing head 503 is assumed for example to be the same as that for the prior art example of FIG. 7, but the diameter of the tip aperture 508 of the head is substantially wider than that of the prior art example, a similar effect can be obtained with respect to maintaining a local atmosphere of assist gas around the region of the workpiece 507 on which the laser beam impinges.

It can thus be understood that with this embodiment, similar effects are achieved to those which could otherwise only be obtained by utilizing either:

(a) A relatively wide tip aperture (so that there is a wide margin of error for the relative positions of the laser beam central axis and the center of the tip aperture of the processing head), and a relatively high rate of flow of assist gas, or (b) A relatively narrow tip aperture (which must be maintained accurately aligned with the central axis of the laser beam) and a relatively low rate of flow of assist gas.

Figure 7:
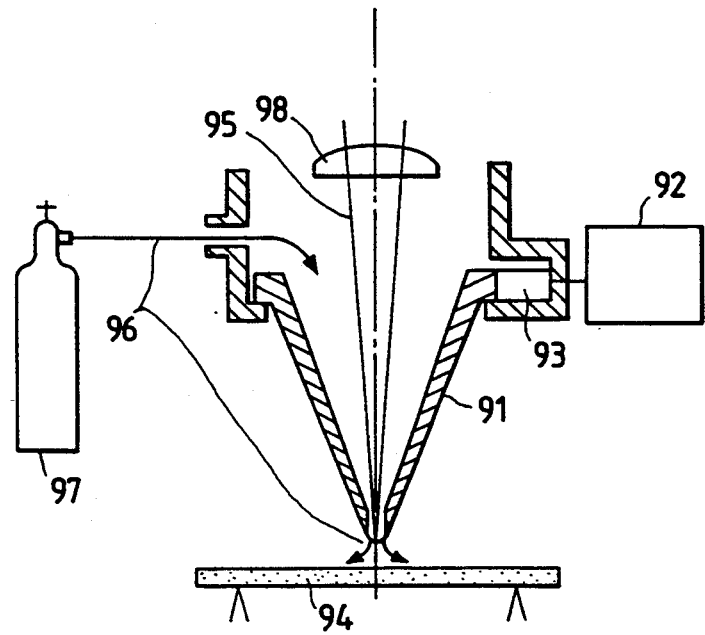
FIG. 7 illustrates a seventh example of a prior art laser processing apparatus, in which a gas is ejected through a nozzle tip aperture formed in a movable portion of a processing head, controlled to maintain alignment with a laser beam emitted by the processing head.

Hence, this embodiment achieves the advantages which are described for the prior art apparatus of FIG. 7. However since there can be a much greater margin of error for positioning the laser beam within the processing head tip aperture, there is no need to provide a complex position control system such as is used in that prior art apparatus. This is a significant advantage, since such a position control system would be impractical for application to a laser processing apparatus having a large number of processing heads.

Figure 24:
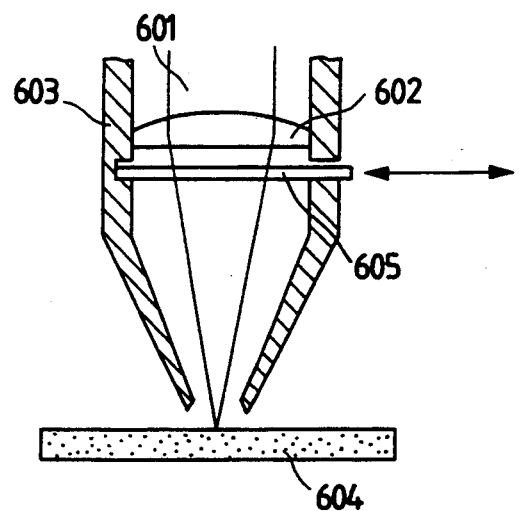
FIG. 24 is a cross-sectional view of a processing head of a ninth embodiment of a laser processing apparatus according to the present invention, wherein a the processing head is provided with a replaceable transparent shield, positioned between a converging lens and a workpiece.

A ninth embodiment of the invention will be described referring to FIG. 24. This is applicable to a split-beam laser processing apparatus having multiple processing heads whereby respective split laser beams are focused onto workpieces by respective converging lenses, as for the preceding embodiments. For simplicity of description, a cross-sectional view of only one of the processing heads is shown, designated by numeral 603. The processing head 603 houses a converging lens 602, which focuses a laser beam 601 onto a workpiece 604. As described above, a problem which arises in utilizing laser beams having very high photon energy such as excimer laser beams is that of obstruction or damage to the converging lenses cause by material driven out from the workpiece. This is due to the fact that the converging lenses must be located quite close to the workpiece surface, and even if measures are used such as passing a flow of assist gas through nozzle apertures of the processing heads, obstruction or damage to the lenses will gradually increase over a long period of use. The embodiment of FIG. 24 overcomes this problem by providing a replaceable protective plate 605, formed of a material which is transparent to the laser beam 601, which is removably mounted in the processing head 603. As shown in FIG. 24, the protective plate 605 can be mounted such as to be easily removed or inserted from/into the processing head 603 in the directions indicated by the arrows. The protective plate 605 is mounted below the lens 602, and serves to prevent any material that is driven out from the workpiece 604 from reaching the converging lens 602, thereby preventing the lens 602 from becoming damaged or coated by such material.

Such a protective plate 605 can be manufactured at much lower cost than a converging lens, since it is not necessary to form the plate to a specific curved shape. Thus, the operating expenses of the laser processing apparatus will not be significantly affected by providing respective ones of such protective plates for each of the converging lenses of the multiple laser beams of such an apparatus. Such a method is therefore greatly preferable to periodic replacement of the converging lenses, as has been proposed in the prior art.

In addition, such a protective plate 605 will effectively protect the converging lens 602 against the heat which is generated by the action of the laser beam on the workpiece 604, and will also prevent dust from becoming deposited on the lens 602 during periods in which the laser processing apparatus is not in use.

The protective plate 605 is a flat plate which is preferably formed of the same material as the converging lens 602, in which case the optical properties of the lens 602 will not be affected by the presence of the protective plate 605.

By utilizing such protective plates 605 for each of the converging lenses of the laser processing apparatus and by periodically replacing the protective plates 605, dust particles driven out from the workpieces during laser beam processing can be effectively prevented from affecting the converging lenses.

It should further be noted that in addition to the low cost of such protective plates, use of such plates has the further significant advantage (by comparison with a method whereby the converging lenses themselves are replaced) that it is not necessary to execute precise re-adjustment of the focus conditions of the converging lenses whenever the protective plates are replaced.

It should also be noted that although in the above description of the eighth and ninth embodiments of the invention it has been assumed that each embodiment is applied to all of the processing heads of a laser processing apparatus, it would be equally possible to apply the embodiments to only a part of the total number of processing heads. In addition, it would be possible to use these embodiments in combination for each processing head or for part of the total number of processing heads of the apparatus.

Figure 6:
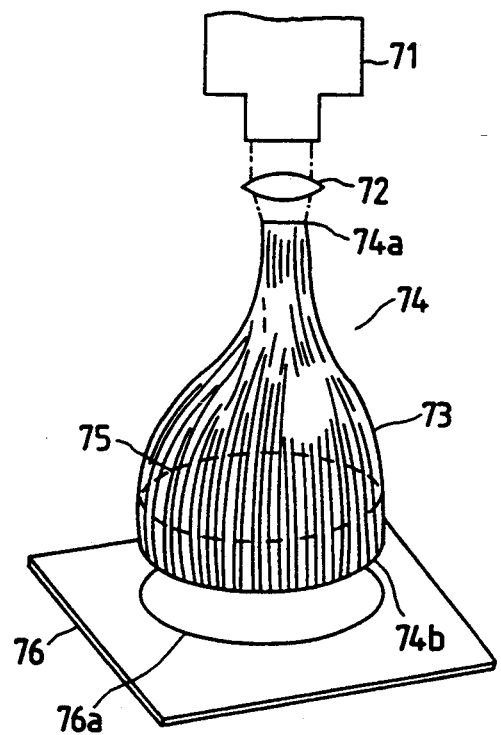
FIG. 6 illustrates a sixth example of a prior art laser processing apparatus, in which a laser beam is split among a large number of optical fibers which are fixed to the periphery of a jig, for directing respective split laser beams onto a workpiece.
Figure 25:
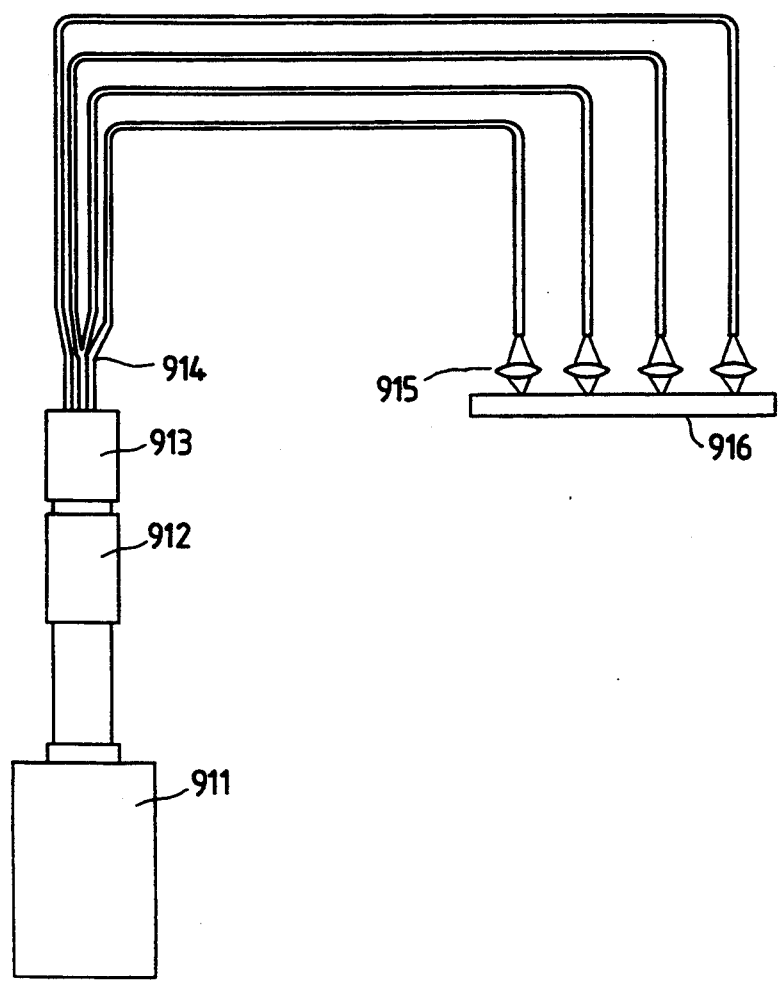
FIG. 25 illustrates the general configuration of a tenth embodiment of a laser processing apparatus according to the present invention, having a holder which fixedly retains a bundle of optical fibers.

FIG. 25 shows the general configuration of a tenth embodiment of a laser processing apparatus according to the present invention. This embodiment has to objective of overcoming the problem described hereinabove referring to FIG. 6, whereby optical fibers within a bundle of fibers (which split a laser beam into a plurality of beams that are respectively transmitted along the fibers) may mutually cross over, thereby reducing the minimum radius of curvature of the fibers and so increasing the angle of divergence of the laser beams which are emitted from the fibers. As a result, part of the light which is emitted from such fibers may be outside the effective diameter of the corresponding ones of the converging lenses 915, so that the amount of light which is directed onto the workpiece 916 from these lenses will be reduced. This problem is most severe in a region close to the incidence ends of the bundle, where the fibers are closely mutually adjacent. With this embodiment, the problem is overcome by providing a receptacle referred to in the following as a holder, within which the portions of the fibers close to the emission ends are held fixedly arranged in such a way as to minimize the possibility of cross-over occurring between the fibers.

In FIG. 25, numeral 911 denotes an excimer laser beam oscillator, 912 denotes an optical system including a beam scrambler and lenses for condensing the laser beam produced by the source 911 to have a suitable cross-sectional size and producing uniform energy density within the laser beam, 923 denotes a holder which encloses a bundle of optical fibers disposed to receive the laser beam emitted from the optical system 912 and thereby transmit respective laser beams to be emitted from the emission ends of the optical fibers. These laser beams are respectively transmitted by respectively corresponding optical fibers 914 to corresponding converging lenses 915, to be focused on a workpiece or plurality of workpieces 916.

It should be understood that the shapes and lengths of the quartz fibers 914 shown in FIG. 25 are not drawn to scale, and that the actual minimum radius of curvature of each of the fibers 914 can be assumed to be sufficiently large to prevent such curvature from significantly affecting the angle of divergence of respective split laser beams transmitted through and emitted from the fibers 914.

Figure 26A:
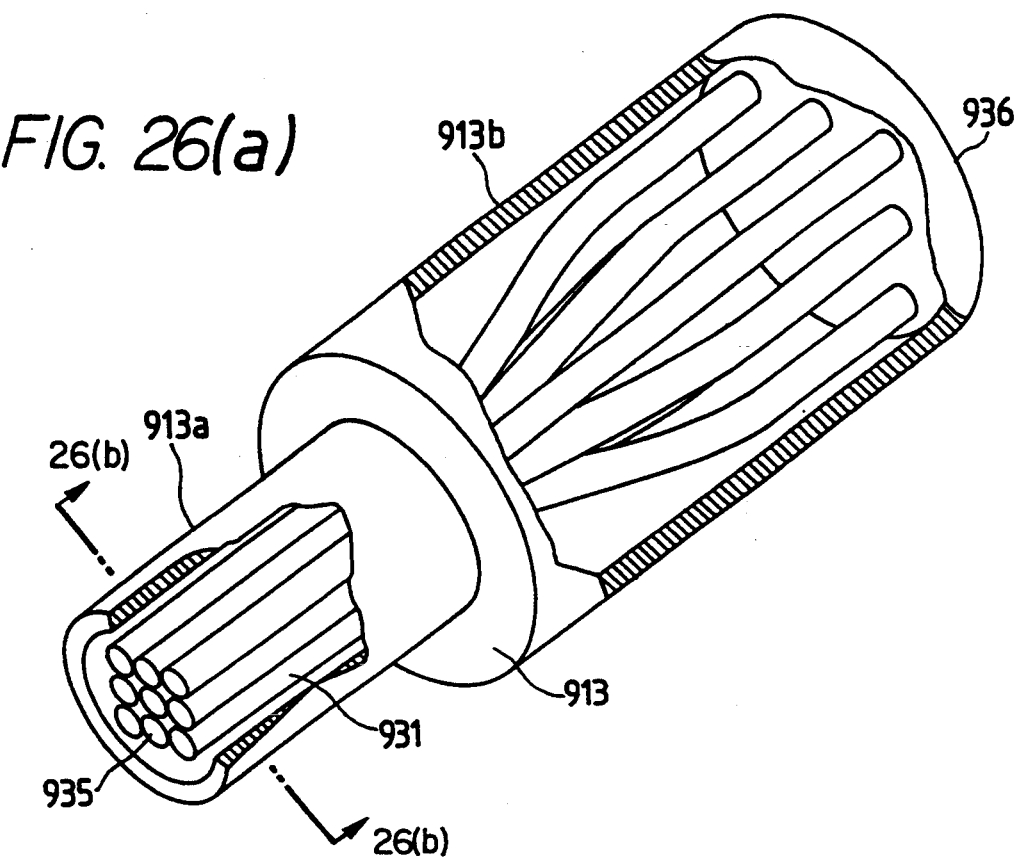
FIGS. 26(a), (b) and (c) shows an oblique partial cross-sectional view and an axial view of the holder and bundle of optical fibers of the embodiment of FIG. 25.
Figure 26B:
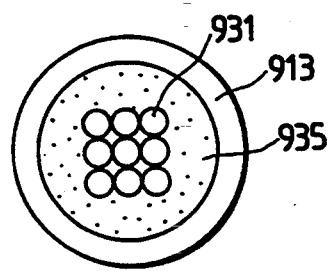

In FIG. 26, diagrams (a) and (b) show the arrangement of the optical fibers 931 within the container 913, with diagram (b) being a view of the incidence ends 935 of the optical fibers 931 within the container 931. The holder 913 is of hollow tubular configuration, formed with a narrow-diameter cylindrical portion 913a in which portions of the optical fibers 931 close to the incidence ends of the fibers 931 are contained, and a wide-diameter cylindrical portion 913b in which portions of the optical fibers 931 close to the emission ends are contained. Space within the holder 913 surrounding the optical fibers 931 is occupied by a filler material 934 which fixedly holds the fibers 931 in place. As shown, portions of each of the optical fibers 931 extending from the incidence ends 935 of the fibers are straight in shape and are packed closely together with mutually adjacent fibers in mutual contact. The optical fibers 931 are preferably quartz fibers, each consisting of a core which is covered by cladding, as described for preceding embodiments. It is assumed for simplicity of description that there are 9 optical fibers constituting the bundle of fibers with this embodiment, however there could be a smaller number, and in general the number of fibers would be larger. The optical fibers in FIG. 26 are arranged in a 3×3 array as shown. Near the incidence ends, within the narrow portion 913a of the holder 913, the optical fibers 931 are arrayed closely mutually adjacent, while within the wide portion 913a the optical fibers gradually curve outward from the central axis of the bundle of fibers, to the respective emission ends of the fibers 931. The curvature is arranged such that the spacings between the fibers 931 gradually increase in a mutually identical manner, towards the emission ends 936 of the fibers, thereby eliminating the possibility of cross-overs occurring between adjacent fibers. That is to say, fibers that are located at identical distances from the central axis of the fiber bundle each gradually curve outward, towards the emission ends, along a path of identical shape.

With this embodiment, respective portions of the fibers 931 extending from the emission ends 936 are straight in shape, as seen in diagram (a) of FIG. 26. These straight portions, as well as the aforementioned straight portions extending from the emission ends 935 of the fibers, are each aligned parallel to the optical axis of the laser beam which falls upon the incident ends 935.

Since the fibers 931 are held fixed in position within the holder 931 by the filler material 934, suitable position relationships between the fibers 931 (i.e. whereby cross-overs between adjacent fibers are prevented) will be permanently maintained. Since the fibers 931 are respectively shaped such as to have a sufficiently large value of minimum radius of curvature, it can be understood that a high degree of stability can be achieved for the respective values of angle of divergence of the laser beams which are emitted from the optical fibers 914 to be focused on the workpiece 916. Variations in processing (e.g. whereby holes of respectively different shape are cut by the various laser beams transmitted through the fibers 914, due to differences in angle of divergence of the emitted beams) can thereby be reduced, so that enhanced stability of processing is achieved.

It should be noted that it is not essential with this embodiment that the optical fibers 931 be curved in the manner described above, so long as it is ensured that fibers do not mutually cross over. It would be possible for adjacent fibers to be mutually spaced apart by identical distances, both at the incidence ends 935 and emission ends 936 and between these ends, and for each of the fibers to follow a path of identical length and shape, e.g. for each of the fibers to follow a straight line. In that case, the holder 913 could be of straight cylindrical shape.

Figure 27A:
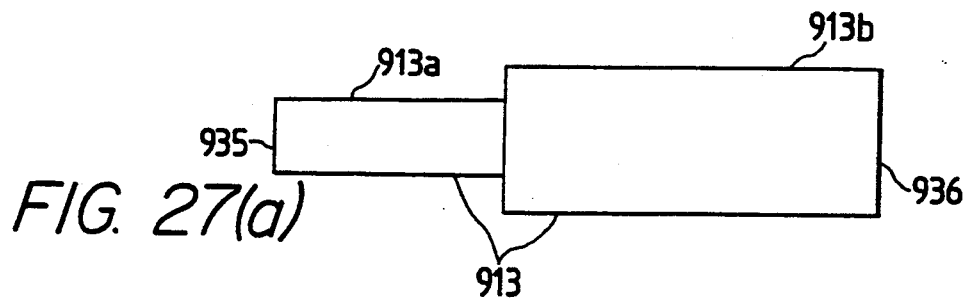
FIGS. 27(a), (b) and (c) illustrates an optical fiber bundle holder of an eleventh embodiment of the invention.
Figure 27B:
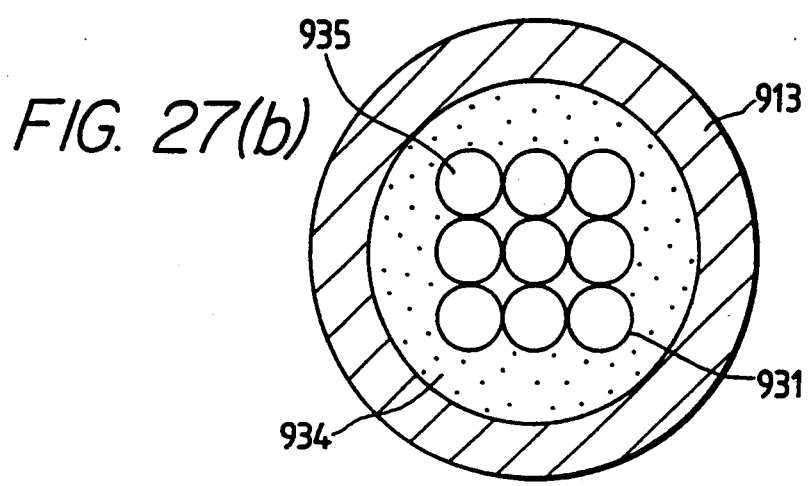
Figure 27C:
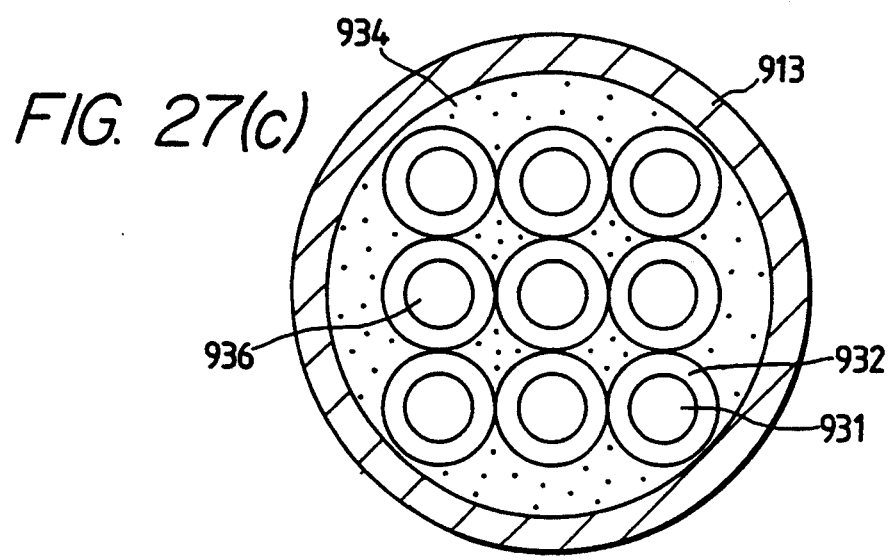

An eleventh embodiment of the invention will be described referring to FIG. 27, which can have the same general configuration as that shown in FIG. 25. This embodiment differs from the tenth embodiment only with respect to the interior of the holder 913. As shown in diagram (a) of FIG. 27, the holder 913 can be of similar shape to the of FIG. 26. Diagram (b) of FIG. 27 is a view of the incidence ends 935 of the optical fibers 931 which are enclosed within the holder 913, while diagram (c) similarly shows the emission ends 936 of the optical fibers. With this embodiment, it can be assumed that each of the optical fibers has been originally covered by an outer sheath of a material such as synthetic resin, and that the outer sheath has been partially stripped from each of the optical fibers 931, with a transition between the sheath-covered and bare condition of each fiber occurring at a position which is intermediate between the incidence and emission ends of the optical fibers. The optical fibers 931 are fixedly held in position within the holder 913 by a filler material 934 which surrounds the fibers.

As shown, adjacent ones of the bare optical fibers 931 are in mutual contact at the incidence ends 935, whereas the outer sheath portions 932 of adjacent ones of the optical fibers 931 are in mutual contact at the emission ends 936.

With this embodiment, the arrangement of the array of incidence ends 935 and array of emission ends 936 of the optical fibers 931 are mutually different, however there is a directly proportional relationship between the position of each of the incidence ends 935 and the corresponding emission end 936. That is, the optical fibers 931 are formed in an N×N array at the incidence ends 935 and also at the emission ends 936 (where M and N are each natural numbers equal to 1 or more, and where M and N each have the value 3 in this embodiment). Considering any arbitrary one of the incidence ends 935 of a fiber, which is at a position $n \times m$ in the N×M array (where $1<m<M$, $1<n<N$), then the emission end 936 of that fiber will also have the same position $n \times m$ in the N×M array at the emission end 936.

With the configuration shown in FIG. 27, the optical fibers 931 are respectively disposed within the holder 913 in such a way that the fibers will not mutually cross over, so that adverse effects on propogation of the light due to such cross-overs can be prevented. In addition, distortion or bending of the optical fibers 931 is eliminated.

In addition, each of the optical fibers 931 is arranged within the holder 913 such as to change in position between the incidence ends 935 and emission ends 936 along a smoothly varying path, to thereby maximize the radius of curvature of each fiber. The angle of divergence of each of the laser beams emitted from the optical fibers 931 can thereby be minimized.

As described hereinabove, the relationship shown in FIGS. 14 and 15 exists between the magnitude of the radius of curvature of an optical fiber and the divergence angle of light which is emitted from that optical fiber. As shown in FIGS. 14, 15, the smaller the radius of curvature of the optical fiber (i.e. the greater the degree of curvature of the fiber), the larger will become the divergence angle. However when the holder 913 of FIG. 27 is used to retain the optical fibers such that the degree of curvature of each fiber is kept small, in a laser processing apparatus of the form shown in FIG. 25, then it can be ensured that a sufficiently small value of divergence angle will be achieved for each of the laser beams which are emitted from the optical fibers 914. This serves to effectively minimize the possibility that the amount of light transmitted through any of the converging lenses 915 will be reduced as a result of an excessively large angle of divergence of the light which is emitted from the corresponding optical fiber 914.

Figure 28:
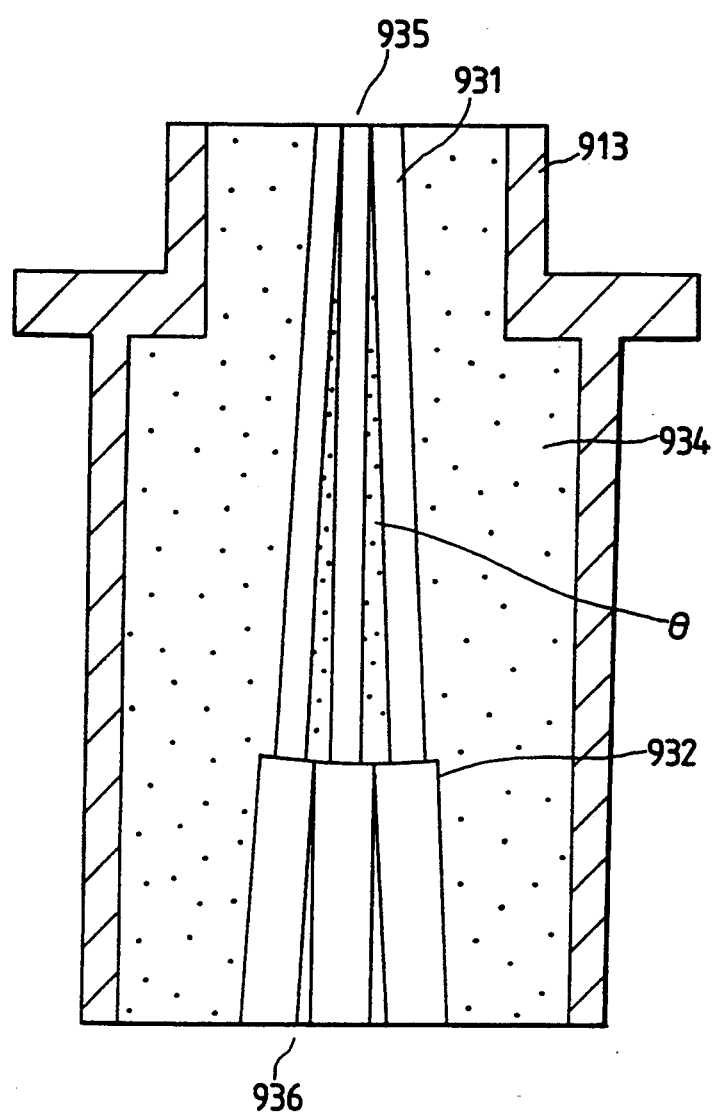
FIG. 28 is a cross-sectional view of an optical fiber bundle holder of a twelfth embodiment of the invention.

A twelfth embodiment of the invention will be described referring to FIG. 28, in which reference numerals are used which correspond to those of the eleventh and twelfth embodiments. This embodiment can have the general configuration shown in FIG. 25, and differs from the tenth embodiment only with respect to the interior of the holder 913. FIG. 28 is a cross-sectional view of that interior. In the same way as described above for the eleventh embodiment, each of the optical fibers 931 is covered with an outer sheath 932 extending along part of the fiber extending from the emission end. The optical fibers 931 are fixedly held within the holder 913 by a filler material 934. Each of the optical fibers extends along a straight line.

With this embodiment, the incidence ends 935 of the optical fibers 931 are packed closely together, with mutually adjacent fibers in mutual contact at their incidence ends. In addition, the outer sheath portions 932 which are mutually adjacent are also in mutual contact. It can thus be understood that a fixed angle, designated as $\Theta$, is formed between each pair of adjacent fibers 931, with the magnitude of that angle being fixedly determined by the thickness of the outer sheath portions 932 and the length of each of these portions in relation to the to total length of the corresponding optical fiber. The smaller the value of that angle $\Theta$, the smaller will be the angle of divergence of the emitted laser beams obtained from the optical fibers 931. The value of $\Theta$ can be minimized by minimizing the length of the sheath portions 932. However if that length is made excessively short, then excessive stress will be applied to the optical fibers 931 at positions near the emission ends 936.

Conversely, if the lengths of the bare portions of the fibers 931 are assumed to be fixed at values which ensure a sufficiently small value of angle $\Theta$ between adjacent fibers, then the mutual spacings between the array of emission ends 936 of the fibers can of course be increased as required by appropriately increasing the lengths of the outer sheath portions 932, i.e. with the total length of the holder 913 and each of the fibers 931 being correspondingly increased.

When the optical fibers 931 are bundled together in the configuration shown in FIG. 28, distortion and curvature of the fibers are held to a minimum. Thus with this embodiment too, when utilized in the apparatus of FIG. 25, it is ensured that the light which is transmitted from the optical fibers 931 along the optical fibers 914 will be emitted from each of the fibers 914 with a sufficiently small divergence angle. It is thereby ensured that no significant reduction will occur in the intensity of light directed onto the workpiece 916 by any of the converging lenses 915, as a result of a large angle of divergence.

Figure 29:
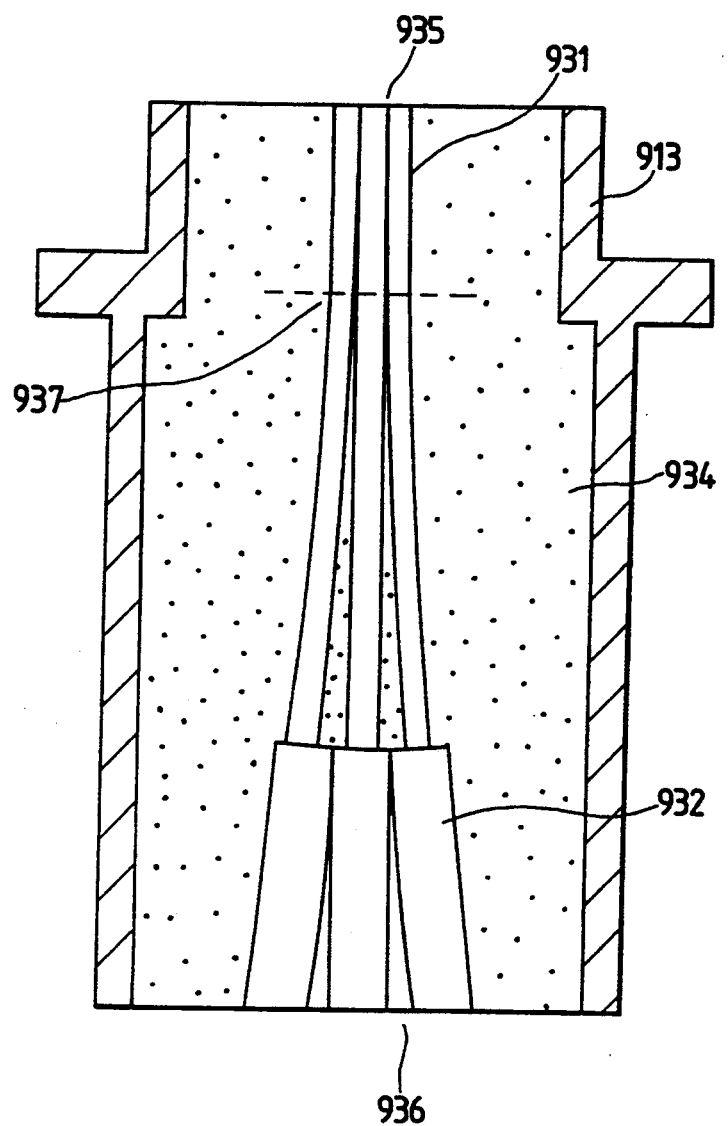
FIG. 29 is a cross-sectional view of an optical fiber bundle holder of a thirteenth embodiment of the invention.

A thirteenth embodiment of the invention will be described referring to the cross-sectional view of FIG. 29. This embodiment is basically similar to the twelfth embodiment described above, so that only the points of difference will be described. With this embodiment, the bare portions of each of the optical fibers 931 are each formed with a straight portion which extends from the incidence ends 935 at least to a position indicated by the broken line 937, and the remainder of the fiber (except in the case of an axially centrally located fiber), including the portion covered by the outer sheath 932, is curved. The straight portions of the optical fibers are aligned mutually parallel, with mutually adjacent fibers being in mutual contact as illustrated in FIG. 29. The radius of curvature of the remaining portion of each optical fiber is determined, in relation to the length of the straight portions of the fibers and the length of the outer sheath portions 932, such that mutually adjacent ones of the outer sheath portions 932 are in mutual contact, at the position along each fiber where the transition between the sheath-covered and bare condition of the fiber occurs.

In this case, in order to maximize the radius of curvature of each optical fibers 931 and thereby minimize the angle of divergence of the laser beams emitted from the optical fibers, the length of each outer sheath portion 932 should be made as short as possible in relation to the length of the bare portion of each fiber. However as described for the twelfth embodiment, that length of the outer sheath portions should not be made excessively short.

Preferably, the minimum radius of curvature of the optical fibers 931 within the holder 913 should be at least 500 times the diameter of the fiber core. The reasons for that are as follows. Based on experiments performed by the assignee of the present invention, it has been found that the angle of emission of light from a quartz optical fiber which is curved can be expressed as a function of the angle of incidence of the light on the optical fiber and the minimum radius of curvature of the optical fiber, by the following equation:

$$\Theta_o = (8.D.n^2/r + \Theta_i^2)^{\frac{1}{2}}$$

In the above, n is the index of refraction of a quartz fiber, r is the minimum radius of curvature of the quartz fiber, $\Theta_i$ is the angle of incidence (full angle), D is the diameter of the optical fiber, and $\Theta_o$ is the angle of emission (full angle).

In addition, the length of the straight (bare) portions of the optical fibers 931, at the incidence ends, should be at least 50 times the fiber core diameter.

With this embodiment, optical fibers which are located close to the central axis of the bundle extend along a substantially straight path, from the incidence to the emission ends of the fibers, while fibers which are more peripherally located will curve outward from the central axis, with the degree of curvature being greatest in the case of the peripherally outermost fibers.

In the above, it has been assumed that the optical fibers 931 are curved (other than at the straight portion of each fiber extending from the incidence end) throughout all of the remainder of a fiber, i.e. up to the emission ends of the fibers. However it would be equally possible for each of the optical fibers 931 to have a straight portion extending from the emission ends 936 in addition to a straight portion extending from the incidence ends 935, with only the remaining portion (between the two straight portions) of a fiber being curved as described above.

When this embodiment is used in a laser processing apparatus of the form shown in FIG. 25, the laser beam falls in parallel on the respective incidence ends of the optical fibers 931 within the holder 913, so that the magnitude of the incidence divergence angle of the laser beam is small. In addition, the degree of curvature of the optical fibers can be made small. As a result, the divergence angle of the split laser beams which are emitted from the optical fibers 914 after being transmitted from the fibers 931, can be made small. Hence, loss of light because of failure of some emitted light to pass through the lenses 915, due to an excessively large angle of divergence, can be effectively reduced.

With this embodiment, and also with the preceding embodiment, the optical fibers 931 are held fixedly retained by the filler material 934 within the holder 913, with sufficiently large values of radius of curvature to ensure a low value of angle of divergence at emission from each optical fiber, and with no possibility of crossovers occurring between adjacent fibers so that there is no danger of any accidental reduction in the minimum radius of curvature of any fiber. Enhanced stability of operation of the laser processing apparatus can thereby be achieved, since a possible source of variations between the respective angles of emission of the beams transmitted via the fibers 931 is effectively eliminated.

The eleventh, twelfth and thirteenth embodiments described above have been described on the assumption that split laser beams transmitted by a plurality of optical fibers fixedly retained within a holder are then transmitted by a second plurality of optical fibers (934) to respective converging lenses to be directed onto workpieces. However it should be understood that in some cases it may also be possible to directly transmit the split laser beams emitted from the optical fibers within the holder, through respective converging lenses, onto workpieces.

Although the present invention has been described in the above with reference to specific embodiments, it will be understood that various modifications to these embodiments, and combinations of respective features of different embodiments, could be envisaged, which fall within the scope claimed for the invention in the appended claims.

What is claimed is:

1. A laser processing apparatus comprising:
   a laser oscillator;
   a laser beam splitting and transmitting unit formed of a plurality of optical fibers arranged in a bundle, for splitting a laser beam emitted by said laser oscillator into a plurality of split laser beams and transmitting said split laser beams along respective ones of said optical fibers to respective emission ends of said optical fibers, said optical fibers having respective incidence ends thereof disposed mutually closely together, positioned to receive said laser beam, and having said respective emission ends thereof spaced apart at regular intervals;
   a split laser beam condensing optical system including a plurality of converging lenses each positioned in relation to a corresponding one of said emission ends, for focusing said split laser beams to produce respective condensed split laser beams;
   workpiece support means for supporting a plurality of workpieces in relation to said split laser beam condensing optical system at respective positions for processing all of said workpieces simultaneously by respective ones of said condensed split laser beams;
   an original laser beam condensing optical system for condensing an original laser beam emitted by said laser oscillator, to form a condensed laser beam having a value of angle of divergence which is substantially unchanged from an angle of divergence of said original laser beam; and
   a beam scrambler formed of a transparent body having an elongated straight cylindrical shape, disposed between said original laser beam condensing optical system and said laser beam splitting and transmitting unit.

2. A laser processing apparatus according to claim 1, wherein said beam scrambler has a length which is at least 10 times a diameter thereof.

3. A laser processing apparatus according to claim 1, wherein a distance between said original laser beam condensing optical system and said beam scrambler is smaller than a diameter of said beam scrambler.

4. A laser processing apparatus according to claim 1, wherein said angle of divergence of said condensed laser beam, transmitted from said original laser beam condensing optical system to be incident on said beam scrambler, is no greater than 0.1 radian.

5. A laser processing apparatus according to claim 1, wherein each of said optical fibers is formed with a straight portion extending from at least an emission end or an incidence end thereof, and wherein said straight portion has a length which is at least 50 times a core diameter of said each optical fiber.

6. A laser processing apparatus according to claim 1, wherein a value of angle of divergence of a light beam emitted from said laser beam splitting and transmitting unit is no greater than 0.1 radian.

7. A laser processing apparatus including a laser oscillator, a plurality of optical fibers arranged for splitting a laser beam emitted by said laser oscillator into a plurality of split laser beams and transmitting said split laser beams along respective ones of said optical fibers to respective emission ends of said optical fibers, a plurality of processing heads respectively connected to said emission ends and having mounted therein respective converging lenses each optically coupled to a corresponding one of said emission ends, and a workpiece table for supporting a plurality of workpieces and enabling arbitrary adjustment of relative positions between said workpieces and processing heads;

wherein each of said workpieces has a work surface thereof positioned slightly farther from a corresponding one of said converging lenses than a focal position of said corresponding converging lens.

8. A laser processing apparatus according to claim 7 wherein said processing heads comprise respective adjustment mechanisms for movably supporting said optical fibers at said emission ends thereof and for enabling individual position adjustment of each of said emission ends in relation to a corresponding one of said converging lenses.

9. A laser processing apparatus including a laser oscillator, a plurality of optical fibers arranged for splitting a laser beam emitted by said laser oscillator into a plurality of split laser beams and transmitting said split laser beams along respective ones of said optical fibers to respective emission ends of said optical fibers, a plurality of processing heads respectively connected to said emission ends, said processing heads having mounted therein respective converging lenses each optically coupled to a corresponding one of said emission ends and each of said processing heads being formed with a nozzle portion having a tip formed with a nozzle aperture through which is emitted a condensed split laser beam produced from the corresponding one of said converging lenses, a workpiece table for supporting a plurality of workpieces respectively adjacent to said processing heads, and means for passing a flow of a gas through each of said processing heads to be ejected through said nozzle aperture thereof;

wherein each of said nozzle portions of said processing heads has formed externally thereon a peripherally surrounding nozzle cover, said nozzle cover having a peripheral annular surface which is substantially coplanar with an end of said tip.

10. A laser processing apparatus according to claim 7, wherein each of said processing heads fixedly retains an emission end of a corresponding one of said optical fibers in a stationary condition, and wherein each of said processing heads includes a movable portion having mounted therein a corresponding one of said converging lenses, and includes an adjustment mechanism operating on said moveable portion for position adjustment of said one of the converging lenses along a direction which is perpendicular to said common plane.

11. A laser processing apparatus according to claim 10, wherein said adjustment mechanism is rotatable for executing said position adjustment.

12. A laser processing apparatus including a laser oscillator, a plurality of optical fibers arranged for splitting a laser beam emitted by said laser oscillator into a plurality of split laser beams and transmitting said split laser beams along respective ones of said optical fibers to respective emission ends of said optical fibers, a plurality of processing heads respectively connected to said emission ends and having mounted therein respective converging lenses each optically coupled to a corresponding one of said emission ends, and workpiece support means for supporting a plurality of workpieces adjacent to said processing heads;

wherein each of said converging lenses is mounted within a corresponding one of said processing heads at a position with respect to a corresponding one of said emission ends whereby a split laser beam emitted from said corresponding emission end has a diameter of divergence, at said position of said converging lens, which is substantially larger than an effective diameter of said converging lens.

13. A laser processing apparatus according to claim 12, wherein within each of said processing heads, a predetermined part of peripheral rays of a split laser beam emitted from a corresponding one of said emission ends are effectively shielded from reaching a corresponding one of said converging lenses.

14. A laser processing apparatus according to claim 13, wherein said peripheral rays are shielded by an internal surface of said each processing head.

15. A laser processing apparatus comprising:
a laser oscillator;
a first plurality of optical fibers, for splitting a laser beam emitted by said laser oscillator into a plurality of split laser beams and transmitting said split laser beams along respective ones of said optical fibers to respective emission ends said optical fibers, said optical fibers having respective incidence ends thereof positioned with said laser beam incident thereon, and having respective emission ends of said optical fibers spaced apart at regular intervals;
a second plurality of optical fibers having respective incidence ends thereof optically coupled to respective ones of said emission ends of the first plurality of optical fibers, for transmitting said split laser beams; and
receptacle means for enclosing and fixedly retaining said first plurality of optical fibers in a condition preventing mutual cross-overs among said first plurality of optical fibers, with said incidence ends of said first plurality of optical fibers respectively exposed at an incidence end of said receptacle means and said emission ends of said first plurality of optical fibers respectively exposed at an emission end of said receptacle means.

16. A laser processing apparatus according to claim 15, comprising a plurality of converging lenses disposed at respective emission ends of said second plurality of optical fibers, for condensing respective ones of said split laser beams.

17. A laser processing apparatus according to claim 15, wherein said receptacle means comprises a holder which is of substantially cylindrical hollow form, and a filler material occupying space within said holder surrounding said first plurality of optical fibers.

18. A laser processing apparatus according to claim 15, wherein said emission ends of said first plurality of optical fibers are arranged in a plane of said emission end of said receptacle means at positions which are different from and proportionally equivalent to respective positions of corresponding ones of said incidence ends of said first plurality of optical fibers in a plane of said incidence end of said receptacle means.

19. A laser processing apparatus according to claim 15, wherein respective portions of said first plurality of optical fibers extending from respective incidence ends thereof are bundled together with mutually adjacent ones of said portions in mutual contact.

20. A laser processing apparatus according to claim 19, wherein said first plurality of optical fibers diverge radially outward, from said incidence ends towards said emission ends thereof.

21. A laser processing apparatus according to claim 20, wherein all of said first plurality of optical fibers are straight in shape.

22. A laser processing apparatus according to claim 21, wherein said first plurality of optical fibers have respective outer sheath portions formed peripherally thereon, along a portion of each of said optical fibers extending from said emission end thereof, and wherein said outer sheath portions are disposed with mutually adjacent ones thereof in mutual contact at respective positions of transition between sheath-covered and bare portions of said first plurality of optical fibers.

23. A laser processing apparatus according to claim 20, wherein at least an axially centrally located one of said first plurality of optical fibers is straight in shape, and wherein each of remaining ones of said first plurality of optical fibers are at least partially curved in shape, to respectively diverge radially outward from said incidence ends to said emission ends thereof.

24. A laser processing apparatus according to claim 23, wherein said first plurality of optical fibers have respective outer sheath portions formed peripherally thereon, along a portion of each of said optical fibers extending from said emission end thereof, and wherein said outer sheath portions are disposed with mutually adjacent ones thereof in mutual contact at respective positions of transition between sheath-covered and bare portions of said first plurality of optical fibers.

25. A laser processing apparatus according to claim 23, wherein a portion of each of said first plurality of optical fibers, extending from said incidence end thereof, is straight in shape and aligned parallel to an optical axis of said laser beam emitted by said laser oscillator.

26. A laser processing apparatus according to claim 23, wherein a portion of each of said first plurality of optical fibers extending from said incidence end thereof and a portion extending from said incidence end thereof, are respectively straight in shape and aligned parallel to an optical axis of said laser beam emitted by said laser oscillator.

27. A laser processing apparatus according to claim 15, wherein each of said first plurality of optical fibers has a minimum radius of curvature which is at least 500 times a value of core diameter of each of said first plurality of optical fibers.

* * * * *